Figure 1:
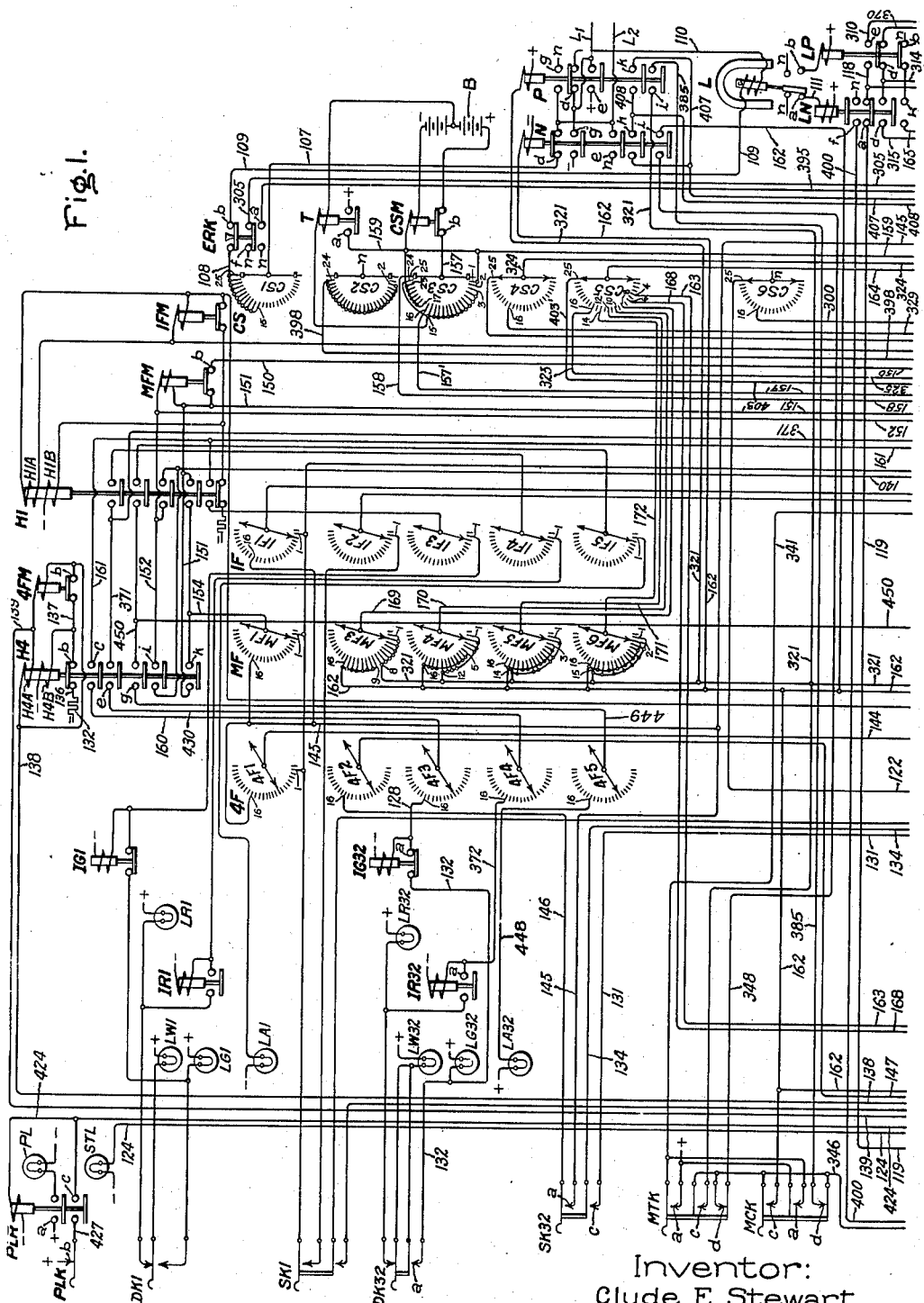

Inventor:
Clyde E. Stewart,
by Harry E. Dunham
His Attorney.

Aug. 19, 1941.    C. E. STEWART    2,253,147
SUPERVISORY CONTROL SYSTEM
Filed Jan. 27, 1939    7 Sheets-Sheet 5

Inventor:
Clyde E. Stewart,
by Harry E. Dunham
His Attorney.

Fig. 6.

Inventor:
Clyde E. Stewart,
by Harry E. Dunham
His Attorney.

Patented Aug. 19, 1941

2,253,147

UNITED STATES PATENT OFFICE 2,253,147

SUPERVISORY CONTROL SYSTEM

Clyde E. Stewart, Upper Darby, Pa., assignor to General Electric Company, a corporation of New York Application January 27, 1939, Serial No. 253,126

12 Claims. (Cl. 177—353)

My invention relates to supervisory control systems for supervising and controlling apparatus in a remote station from a control station such as a dispatcher's office.

One object of my invention is to provide an improved two-wire supervisory control system of the type disclosed and claimed in the copending application, Serial No. 114,002, filed December 3, 1936, by Leo D. White and Clyde E. Stewart, Patent No. 2,205,894, June 25, 1940, and assigned as the same assignee as this application. In this type of system a desired apparatus unit in the remote station is selected by transmitting to the remote station over two line conductors, which interconnect the two stations, a predetermined code of current impulses individual to the desired apparatus unit. After the selection is made, it is checked by transmitting over the two line conductors in series to the control station a predetermined code of impulses individual to the selected unit and then an indication impulse of a character corresponding to the position of the selected unit. If the check code corresponds to the select code, an indication check impulse is transmitted to the remote station of the same polarity as the indication impulse. If the indication check impulse agrees with the position of the selected apparatus unit, this unit can then be operated by transmitting an impulse of the proper polarity over the two line conductors.

Another object of my invention is to provide an improved two-wire supervisory control system of the above mentioned type which requires a minimum amount of apparatus and a minimum amount of time to effect a desired supervisory and control operation.

Another object of my invention is to provide an improved arrangement for controlling the signalling means, which normally displays at the dispatcher's office an indication corresponding to each apparatus unit at the remote station, so as to insure that the indicating means displays the correct indications.

A further object of my invention is to provide an arrangement for insuring that whenever an impulse is transmitted to effect the operation of a selected apparatus unit, the impulse is always of sufficient duration to effect the desired operation.

Another object of my invention is to provide an arrangement whereby the dispatcher is informed of any apparatus unit having a faulty auxiliary switch which causes the supervisory apparatus to select the corresponding apparatus unit but prevents an indication impulse from being transmitted to the dispatcher's office after the selection has been established and whereby the dispatcher may release such a selection and establish a connection to any other desired apparatus unit.

Other objects of my invention will appear and my invention will be better understood from the following description when taken in connection with the accompanying drawings, and the scope of my invention will be pointed out in the appended claims.

Figure 2:
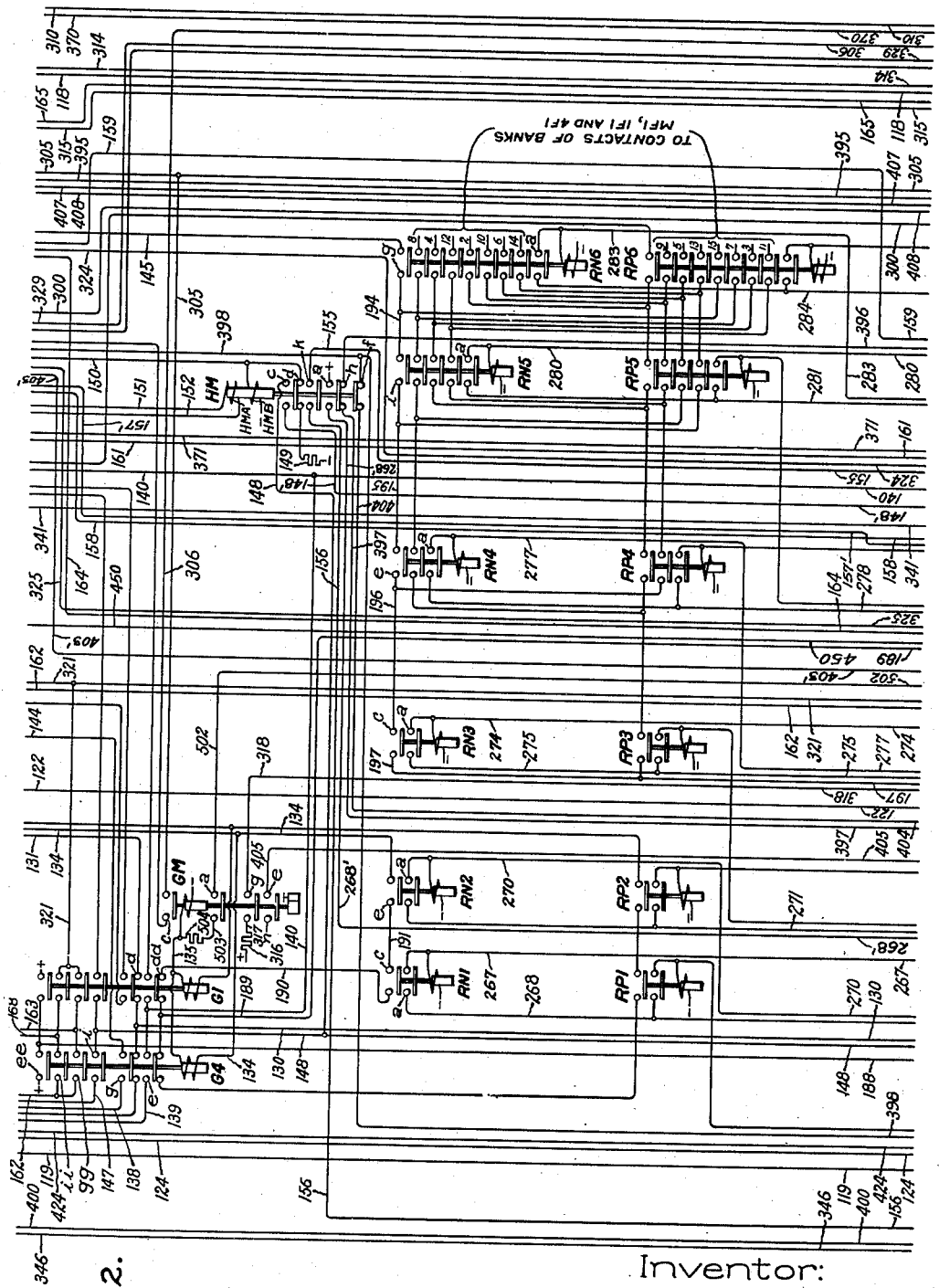
Figure 3:
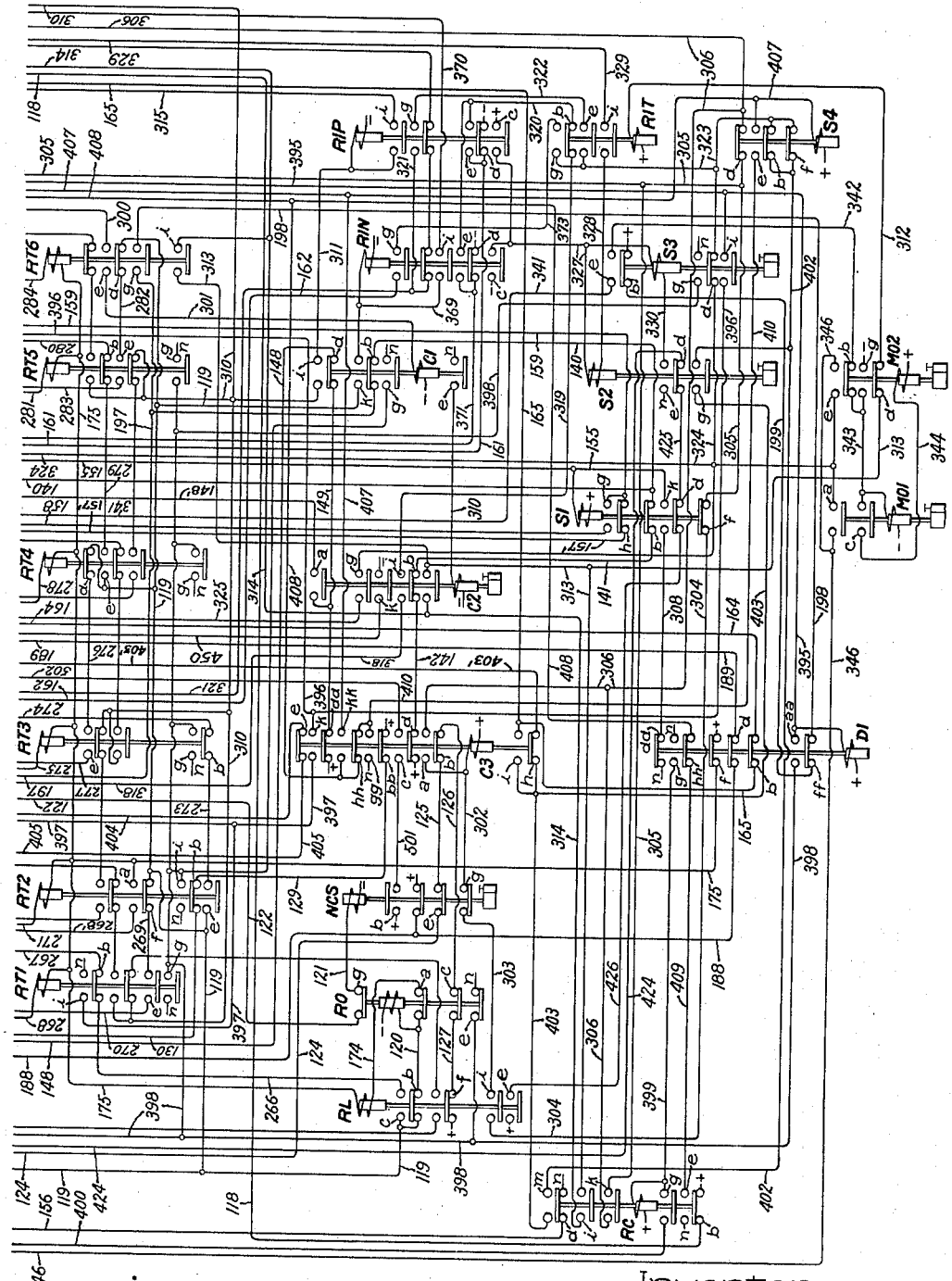
Figure 4:
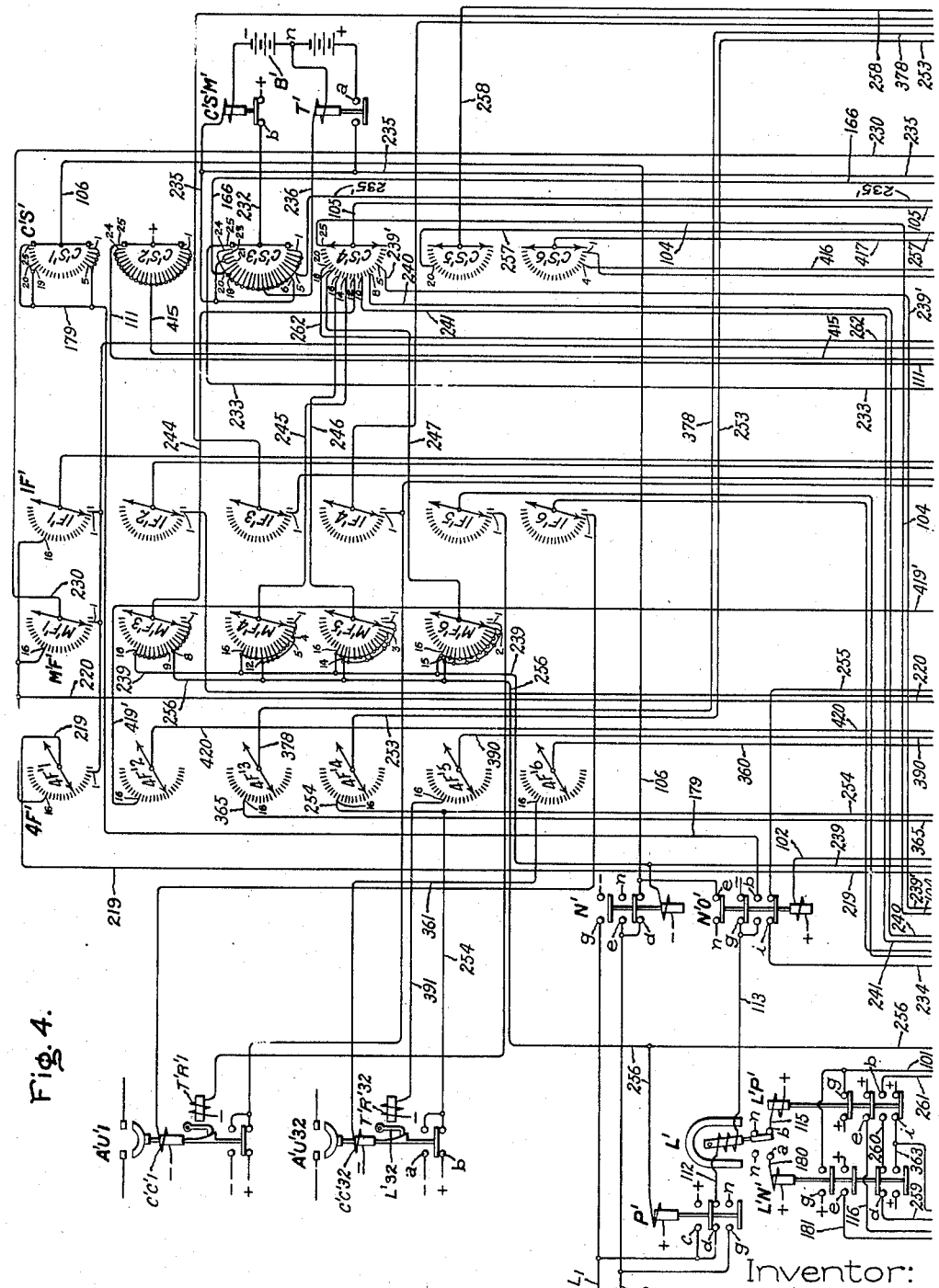
Figure 5:
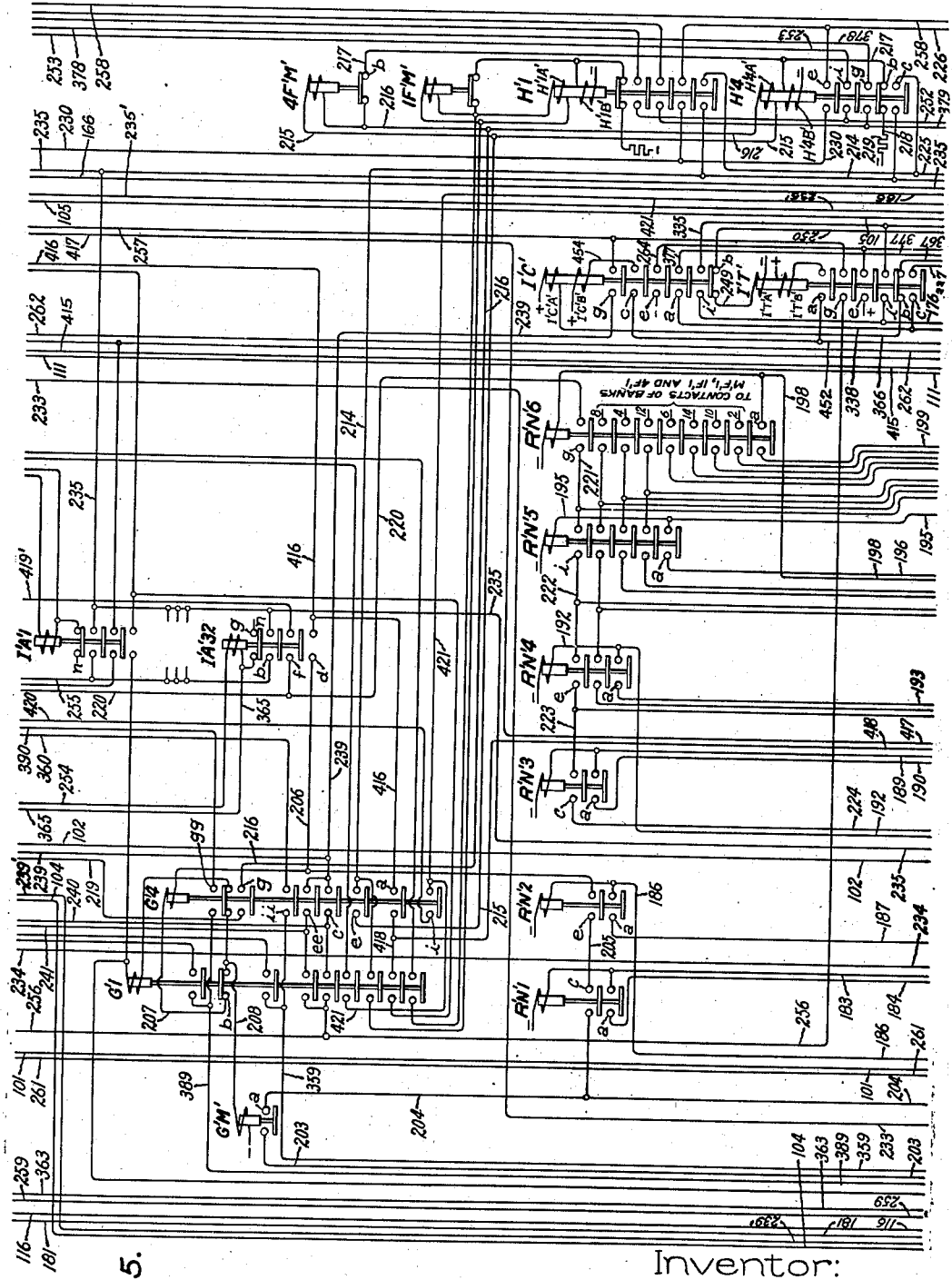
Figure 6:
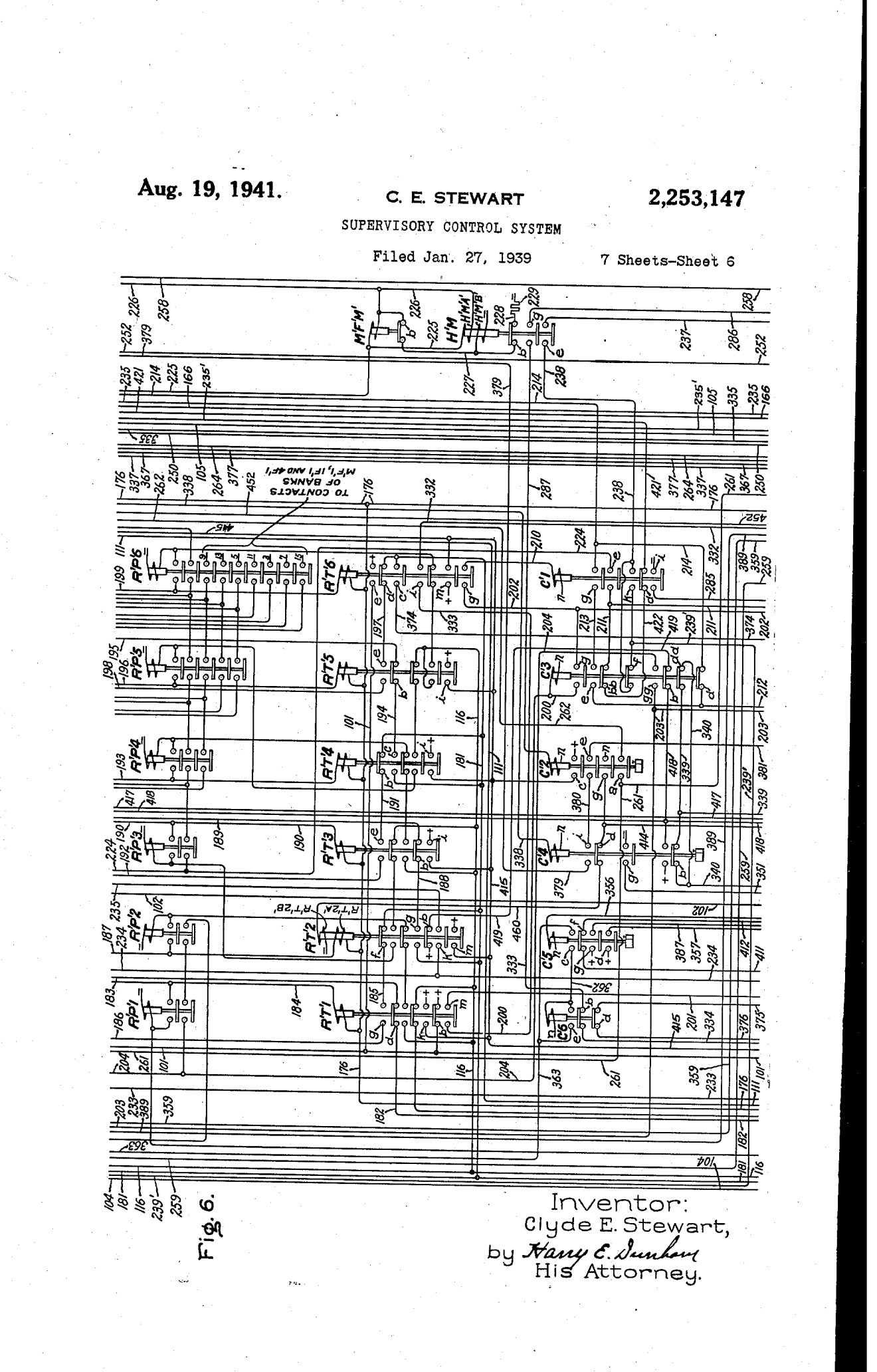
Figure 7:
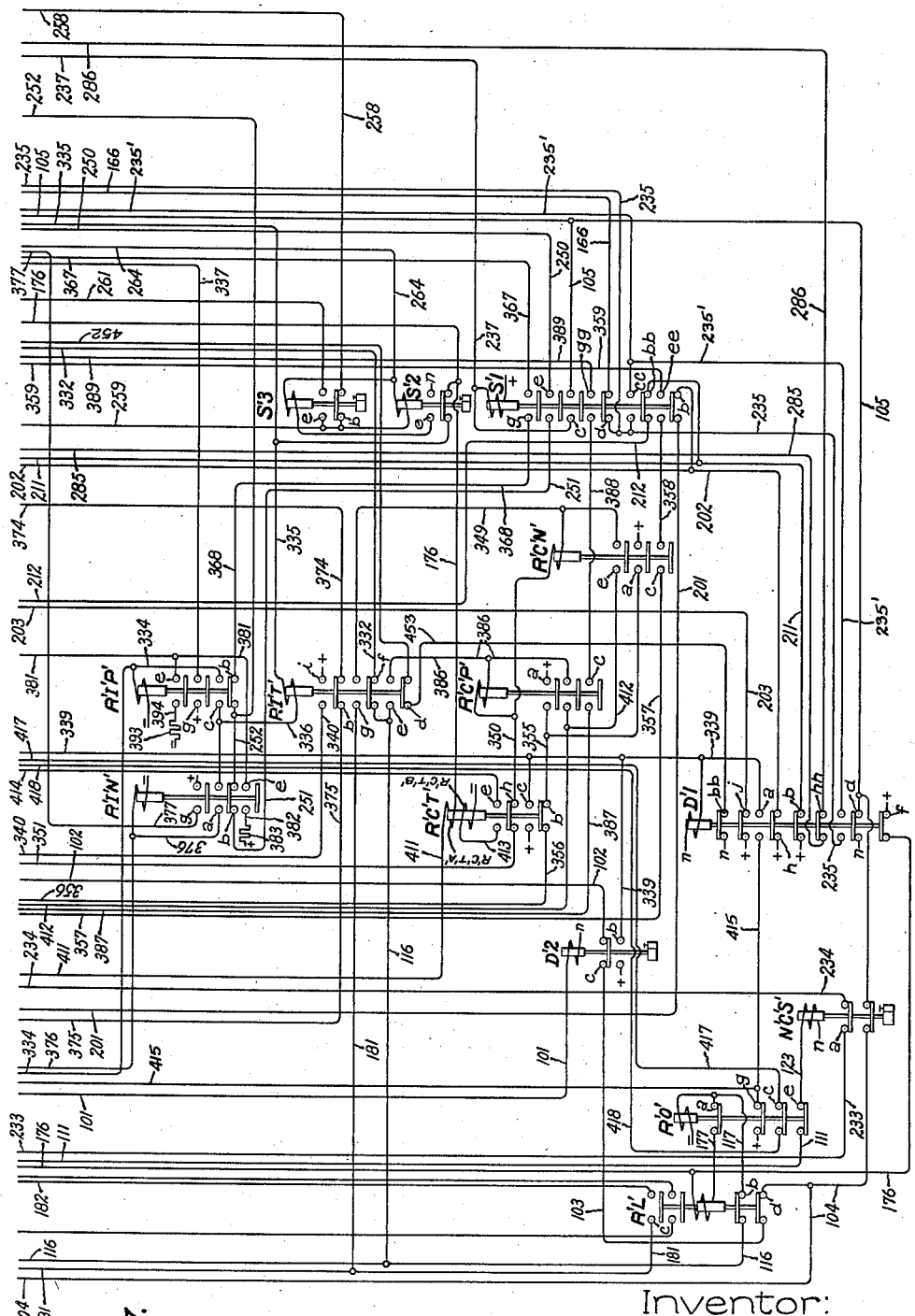

Referring to the accompanying drawings, which comprise Figs. 1 to 7, inclusive, sufficient apparatus and circuits of a supervisory control system embodying my invention have been shown therein, by means of the usual conventional diagrams to enable my invention to be readily explained and understood by those skilled in the art. The apparatus and circuits diagrammatically shown in Figs. 1, 2 and 3 are located in the controlling or dispatcher's office, and the apparatus and circuits diagrammatically shown in Figs. 4, 5, 6 and 7 are located at the remote controlled station, which is connected to the dispatcher's office by the two line conductors L1 and L2.

At the dispatcher's office, I provide a group of control keys and indicating lamps for each apparatus unit to be selected and controlled at the remote station. In the particular system shown in detail in the drawings, it is possible to make thirty-two different selections at the remote station. Therefore, it is possible to have as many as thirty-two different groups of keys and lamps at the dispatcher's office. However, in order to simplify the disclosure, only two groups of keys and lamps are shown, one of the groups corresponding to the apparatus unit A'U'1 at the remote station and the other group corresponding to the apparatus unit A'U'32. The thirty-two possible selections in the particular system shown are divided into two groups of sixteen selections, and the selection whereby apparatus unit A'U'1 is selected is in one group and the selection whereby apparatus unit A'U'32 is selected is in the other group.

Each group of keys consists of a two-position select key such as SK1 and SK32, which is operated by the dispatcher when he wants to select the corresponding apparatus unit for operation and a two-position disagreement key such as DK1 and DK32 which controls the operation of the corresponding indicating lamps. Each group of indicating lamps consists of a red lamp such as LR1 and LR32 which, when lighted, indicates that the corresponding apparatus unit is in its closed position; a green lamp such as LG1 and LG32 which, when lighted, indicates that the corresponding apparatus unit is in its open position; a white lamp, such as LW1 and LW32, which, when lighted, indicates that the position of the corresponding apparatus unit does not correspond with the position of the associated disagreement key; and an amber lamp such as LA1 and LA32, which, when lighted, indicates that the corresponding apparatus unit has been selected by the supervisory equipment. Each group of keys and lamps has associated therewith an individual pair of indicating relays such as IR1, IG1 and IR32, IG32 which determine by their positions whether the associated red or green lamp is lighted and which cooperates with the associated disagreement key to determine whether the associated white lamp is lighted. The position of each indicating relay in turn is determined by the position of the corresponding apparatus unit in a manner which will be hereinafter described.

As shown in the drawings, the indicating relays IR1, IG1, IG32 and IR32 are in the positions they occupy when the corresponding apparatus units A'U'1 and A'U'32 are in their open positions and the control keys DK1 and DK32 are shown in the positions they occupy when the green lamps LG1 and LG32 are lighted and the other lamps associated with select keys SK1 and SK32 are not lighted. It will be readily seen from the drawings that if either disagreement key should be moved from the position in which it is shown to its other position, the associated white lamp would be lighted.

When the dispatcher desires to make a certain selection at the remote station, he operates the corresponding select key at the dispatcher's office and this effects at the dispatcher's office the energization of either the group relay G1 or the group relay G4, depending upon which group of sixteen selections at the remote station the desired selection is in. The energized group relay causes the associated group finder selector 1F or 4F to move to the position thereof individual to the operated select key. When the operated finder selector reaches the selected position, it stops in that position and causes the master finder selector MF to move to its position which is allotted to the operated select key. When the group finder stops in the position allotted to an operated select key, the circuits of the green and red indicating lamps associated with the operated select key are controlled so as to extinguish whichever of these lamps is then lighted. The energized group relay and the position of the master finder switch MF sets up a code, consisting of a series of six positive and negative current impulses, which is individual to the operated select key. When the master finder switch MF stops in the position corresponding to the operated select key, the operation of a code sender CS is initiated to transmit over the two line conductors L1 and L2 the code which has been set up by the energized group relay and the master finder switch MF.

As shown in the drawings, the finder switches MS, 1F and 4F and the code sender CS are selector switches of the well-known rotary type comprising a plurality of banks of twenty-five contacts, each bank having associated therewith a cooperating wiper. Each switch is provided with a suitable operating magnet for simultaneously moving in a well known manner all of the wipers thereof in a step by step movement over the contacts of the respective banks. As shown in the drawings, the finder switch 1F consists of five banks, 1F1 to 1F5, inclusive, a cooperating wiper for each bank, and an operating magnet 1FM; the finder switch 4F consists of five banks, 4F1 to 4F5, inclusive, a cooperating wiper for each bank and an operating magnet 4FM; the finder switch MF consists of five banks MF1 and MF3 to MF6, inclusive, a cooperating wiper for each bank, and an operating magnet MFM; and the code sender CS consists of six banks CS1 to CS6, inclusive, a cooperating wiper for each bank, and an operating magnet CSM.

The operating magnet of each finder switch has associated therewith a holding relay having two opposing windings respectively connected in parallel and in series with the operating magnet, in the manner disclosed in U. S. Letters Patent 2,132,277, granted October 4, 1938, and assigned to the same assignee as this application. For example, the operating magnet MFM for switch MF has associated therewith a holding relay HM which has a winding HMA connected in parallel with the operating magnet MFM and a winding HMB connected in series with the operating magnet MFM so that, during the stepping operation of the finder, the two opposing windings HMA and HMB of the associated holding relay HM are equally energized, but, when the selector reaches a position in which it is to stop, the parallel connected operating magnet MFM and winding HMA are short-circuited so that only the series winding HMB of the holding relay HM is energized. The relay HM then picks up. The operating magnets 1FM and 4FM have similar holding relays H1 and H4 respectively associated therewith.

Normally, each of the finder switches MF, 1F and 4F is at rest in the last position to which it was operated. The operation of any select key first causes the group finder associated with the operated select key to move from whatever position it may be in to a position corresponding to the operated select key. Then the master finder switch MF moves from whatever position it may be in to a position corresponding to the operated select key. For example, when the select key SK1 is operated, the group finder switch 1F first moves to its position 1, and then the master finder switch MF moves to its position 1. When the select key SK32 is operated, the group finder switch 4F moves to its position 16, and then the master finder switch MF moves to its position 16.

The code-sending selector CS is normally at rest in its position 25. When the master finder switch MF stops in a position corresponding to an operated select key so that the associated holding magnet HM is energized, the operating magnet CSM of the code sender CS is operated to move the code sender CS from its position 25 through its position 1 to its position 16. During this operation of the code sender CS, a circuit is completed in its positions 4, 6, 8, 10, 12 and 14 for either a relay P or a relay N depending upon the position of the finder switch MF and upon which group relay is energized. The relay P, when energized, is arranged to cause a positive impulse to be transmitted over the line conductors L1 and L2 and the relay N, when energized, is arranged to cause a negative impulse to be transmitted over the line conductors L1 and L2. In this manner, a series of six positive and negative impulses permutated individual to the operated select key is transmitted to the remote station to effect the desired selection.

At the remote station, each of these current impulses energizes a polarized relay L' so that it effects the energization of the relay L'P' in response to a positive impulse and the relay L'N' in response to a negative impulse. The relays L'P' and L'N' are so connected that the first impulse of the series of six impulses constituting the select code effects the energization of either the relay R'P'1 or R'N'1, depending upon the polarity of the impulse. At the termination of this first impulse, relay R'T'1 is energized to transfer the connections so that the second impulse of the select code effects the energization of either the relay R'P'2 or R'N'2, depending upon the polarity of the second impulse. At the termination of the second impulse the relay R'T'2 is energized to transfer the connections so that the third impulse of the select code effects the operation of either the relay R'P'3 or R'N'3, depending upon the polarity of the third impulse. In a similar manner, the relays R'T'3, R'T'4, R'T'5, and R'T'6 are respectively energized at the end of the third, fourth, fifth, and sixth impulses of the select code and either the relay R'P'4 or R'N'4 is energized in response to the fourth impulse and either the relay R'P'5 or R'N'5 is energized in response to the fifth impulse and either the relay R'P'6 or R'N'6 is energized in response to the sixth impulse of the select code.

The combination in which the relays R'P'1, R'N'1, R'P'2, and R'N'2 are energized in response to the first two impulses of the select code determines which of the two group relays G'1' and G'4' at the remote station is energized after the second impulse. In the particular arrangement shown, the relay G'1' is energized when the desired selection is one of the group of sixteen selections which includes the selection whereby apparatus unit A'U'1 is selected, and the relay G'4' is energized when the desired selection is one of the other group of sixteen selections which includes the selection whereby the apparatus unit A'U'32 is selected.

If either the group relay G'1' or G'4' is energized when the relay R'T'6 is energized at the termination of the last impulse of the select code, a master finder switch M'F' and either finder switch 1F' or 4F', depending upon which group relay is energized, is operated to positions corresponding to the combination in which the relays R'P'3, R'N'3, R'P'4, R'N'4, R'P'5, R'N'5, R'P'6 and R'N'6 are energized as a result of the last four impulses of the select code. The finder switches M'F', 1F', and 4F' are similar in construction to the finder switches MF and the code sender CS at the dispatcher's office in that each of these switches is a rotary selector switch including a plurality of banks of twenty-five contacts. Normally, each of these finder switches at the remote station is in the position to which it was last operated. When the group relay G'1' is energized in response to the first two impulses of the select code, the subsequent energization of relay R'T'6 at the termination of the last impulse of the select code effects the movement of the finder switch 1F' to a position corresponding to the selection effected by the last four impulses of the select code and then the master finder switch M'F' moves to a corresponding position. When the common group relay G'4 is energized in response to the first two impulses of the select code, the subsequent energization of relay R'T'6 causes the finder switches 4F' to move to a position corresponding to the selection effected by the last four impulses of the select code and then the master finder switch M'F' moves to a corresponding position. In the arrangement shown, the last four impulses of the select code are arranged to energize the relays R'P'3, R'N'3, R'P'4, R'N'4, R'P'5, R'N'5, R'P'6 and R'N'6 in sixteen different combinations and each of these sixteen combinations is arranged to complete suitable circuits through corresponding contacts in corresponding banks of the finder switches M'F', 1F' and 4F'. For example, the select code transmitted in response to the operation of the select key SK1 effects the sequential energization of the relays R'P'3, R'P'4, R'P'5 and R'P'6, so that a circuit is completed through certain contacts of these four relays in series to contact 1 in banks M'F'2, 1F'2, and 4F'2 to stop the finder switches in this particular position. Similarly the select code transmitted in response to the operation of the select key SK32 is arranged to effect the sequential energization of the relays R'N'3, R'N'4, R'N'5, and R'N'6 so that a circuit is completed through certain contacts of these relays in series to contacts 16 in the banks M'F'2, 1F'2 and 4F'2 to stop the finder switches in this particular position.

As soon as the master finder switch M'F' has reached the position corresponding to the selection that has been established by the select code, a code sender C'S', which is similar in construction to the code sender CS at the dispatcher's office is started to transmit to the dispatcher's office over the two line conductors L1 and L2 a check code which is individual to the selection that has been established. In the arrangement shown this check code consists of a series of six positive and negative impulses and is set up by the energized group relay and the position in which the master finder switch M'F' stops and preferably this check code is the same as the corresponding select code.

Normally, the code sender C'S' is in its position 25 and when the relay R'T'2 is energized at the end of the second impulse of the select code, the operating magnet C'S'M' of the code sender C'S is operated to move the code sender C'S' to its position 5. When the master finder switch M'F' reaches the position corresponding to the established selection, the operating magnet C'S'M' is operated to move the code sender C'S' from position 5 to position 20. During this operation of the code sender C'S', a circuit is completed in its positions 8, 10, 12, 14, 16 and 18 for either the relay P' or the relay N', depending upon the position of the finder switch M'F' and upon which group relay is energized at the remote station. The relay P', when energized, is arranged to cause a positive impulse to be transmitted over the line conductors L1 and L2 and the relay N', when energized, is arranged to cause a negative impulse to be transmitted over the line conductors L1 and L2. In this manner, a series of six positive and negative impulses permutated individual to the selection which has been established is transmitted to the dispatcher's office. Also when the sender C'S' reaches its position 20 either the relay P' or N' is energized in a manner hereinafter described to effect the transmission over the line conductors L1 and L2 of either a positive or a negative impulse, depending upon the position of the apparatus unit which has been selected.

At the dispatcher's office, each of the impulses of the check code energizes a polarized relay L so that it effects the energization of a relay LP in response to a positive impulse and a relay LN in response to a negative impulse. The relays LP and LN are so connected that the first impulse of the check code effects the energization of either the relay RP1 or RN1 depending upon the polarity of this impulse. At the termination of this first impulse, relay RT1 is energized to transfer the connections so that the second impulse of the check code effects the energization of either the relay RP2 or RN2, depending upon the polarity of the second impulse. At the termination of the second impulse, relay RT2 is energized to transfer the connections so that the third impulse of the check code effects the operation of either the relay RP3 or RN3, depending upon the polarity of the third impulse. In a similar manner, the relays RT3, RT4, RT5, and RT6 are respectively energized at the end of the third, fourth, fifth, and sixth impulses of the check code and either the relay RP4 or RN4 is energized in response to the fourth impulse, and either the relay RP5 or RN5 is energized in response to the fifth impulse, and either the relay RP6 or RN6 is energized in response to the last impulse of the check code.

When the relay RT2 is energized at the termination of the second impulse of the check code, it effects the opening of circuit which has previously been established for the energized group relay and when relay RT6 is energized at the termination of the last impulse of the check code, it effects the momentary opening of the holding circuits which have previously been established for the finder switch magnets MFM, IFM and 4FM at the dispatcher's office. However, if the check code agrees with the select code that has previously been transmitted, the relays RP1, RN1, RP2 and RN2 are energized in the proper combination to establish a substitute holding circuit for the energized group relay and the relays RP3, RN3, RP4, RN4, RP5, RN5, RP6 and RN6 are also energized in the proper combination to establish substitute holding circuits for the finder switch magnets MFM, IFM and 4FM during the momentary interval that the original holding circuits are interrupted. If the check code does not agree with the select code, circuits are established to reset the control apparatus to normal without relighting the indicating lamps associated with the operated select key. In case the check and select codes agree, the receipt of the indication impulse which follows the check code operates either relay RIP or relay RIN, depending upon the polarity of the indication impulse.

The selective energization of the relays RIP and RIN in response to the indication impulse then effects the lighting of the indicating lamps associated with the operated select key in accordance with the position of the corresponding apparatus unit, and also effects the energization of either the relay P or the relay N to cause an indication check impulse of the same polarity as the indication impulse to be transmitted over the line conductors L1 and L2 to the remote station for a predetermined time.

If the indication check impulse agrees with the position of the selected apparatus unit, circuits are prepared at the remote station which permit the selected apparatus unit to be operated by control impulses transmitted over the line conductors L1 and L2 from the dispatcher's office. If the indication check impulse does not agree with the position of the selected apparatus unit, circuits are immediately established to reset the control apparatus at both stations to normal.

After the position of the selected apparatus unit has been checked, the dispatcher can operate the selected apparatus unit by operating either the master close key MCK or the master trip key MTK. The operation of the master close key MCK effects the energization of the relay N so that a long negative impulse is transmitted over the line conductors L1 and L2 to the remote station where this negative impulse effects the energization of the relay R'C'N' to complete the necessary circuits to effect the closing operation of the selected apparatus unit. The operation of the master trip key MTK effects the energization of the relay P to cause a long positive impulse to be transmitted over the line conductors L1 and L2 to the remote station where this positive impulse effects the energization of the relay R'C'P' so as to complete the necessary circuits to effect the tripping operation of the selected apparatus unit.

At the termination of each control impulse, circuits are established at the dispatcher's office, which cause the lighted indicating red or green lamp, associated with the operated select key, to be extinguished.

The operation of the selected apparatus unit prepares the necessary circuits so that at the termination of the control impulse, a new indication impulse corresponding to the new position of the selected apparatus unit is sent over the line conductors L1 and L2 to cause the indicating lamps associated with the operated select key to indicate the new position of the selected apparatus unit. Immediately after this new indication impulse is received at the dispatcher's office, the equipment thereat promptly sends back to the remote station an indication check impulse in the same manner as above described to energize either relay R'I'P' or R'I'N' depending upon the polarity of the indication check impulse.

The dispatcher may operate the selected apparatus unit as many times as desired, without releasing the selection, by operating the master operate keys MCK and MTK. After each operation of the apparatus unit, an indication impulse is transmitted to operate the corresponding indicating lamps to indicate the new position of the selected apparatus unit and an indication check impulse is transmitted to operate either R'I'P' or R'I'N' to reestablish the proper connections at the remote station.

The dispatcher may release the selection and restore the apparatus to normal merely by restoring the operated select key to its normal position. In resetting, the equipment at the dispatcher's office sends a short impulse of a polarity corresponding to that of the last indication impulse received and this impulse effects the necessary connections at the substation to reset the apparatus thereat.

When the substation equipment resets, it causes the normal check current to flow through the line conductors L1 and L2 and this check current effects the resetting of the dispatcher's office equipment to normal.

A detailed description of the operation of the system shown in the drawings is as follows: With the system at rest and in operative condition, the finder switches MF, M'F, IF, IF', 4F and 4F', may be in any of their respective positions, and the code senders CS and C'S' are stopped in their respective positions 25. Under these conditions at the remote station, a circuit is completed for relay D'2 from the positive terminal of battery B' through contacts b of relay R'T'I, conductor 101 and winding of relay D'2 to the neutral terminal of battery B'. A circuit is also completed for the relay N'O' from the positive terminal of battery B' through winding of relay N'O', conductor 102, contacts c of relay D'2, conductor 103, contacts d of relay R'L', conductor 104, contact 25 and wiper of bank C'S'4, conductor 105, contacts d of relay D'I, to the neutral terminal of battery B'. A check circuit is also completed from the neutral terminal of battery B' through contacts e of relay N'O', conductor 106, contacts d of relay N', line conductor L2, contacts d of relay N, conductor 107, wiper and contact 25 of bank CSI, conductor 108, contacts b of emergency reset key ERK, conductor 109, operating winding of polarized relay L, conductor 110, contacts d of relay P, line conductor L1, contacts d of relay P', conductor 112, operating winding of polarized relay L', conductor 113, contacts g of relay N'O' to the negative terminal of battery B'. The current in this circuit is in the proper direction to cause the polarized relay L to close its contacts a and relay L' to close its contacts b. An energizing circuit is therefore completed from the neutral of battery B through the contacts a of the relay L, conductor 111, operating winding of relay LN to the positive terminal of battery B. A similar energizing circuit is completed for the relay L'P' at the remote station from the neutral of battery B' through contacts b of relay L', conductor 115, winding of relay L'P', to the positive terminal of battery B'. Through its contacts e, relay L'P' completes an energizing circuit for the relay R'O' from the positive terminal of battery B' through the contacts e of relay L'P', conductor 116, contacts b of relay R'L', conductor 117, winding of relay R'O' to the negative terminal of battery B'.

Relay R'O' by closing its contacts e completes a circuit from the positive terminal of battery B' through wiper and contact 25 of bank C'S'2, conductor 111, contacts e of relay R'O', conductor 123, winding of relay N'C'S' to the neutral of battery B'.

The contacts a of the energized relay LN compete a circuit from the positive terminal of battery B through contacts b of relay RC, conductor 118, contacts a of relay LN, conductor 119, contacts b of relay RL, conductor 120, winding of relay RO to the negative terminal of battery B. Through contacts g of relay RO an energizing circuit is completed for time relay NCS from the negative terminal of battery B, winding of relay NCS, conductor 121, contacts g of relay RO, conductor 122, contact 25 and wiper of bank CS6 to the neutral of battery B. Through the contacts c of the energized relay RO, a circuit is completed for the start light STL from the negative terminal of the battery through the start light STL, conductor 124, contacts e of the relay NCS, conductor 125, contacts b of relay C3, conductor 126, contacts c of relay RO, conductor 127, contacts f of relay RL, to the positive terminal of battery B. The lighting of the start lamp STL informs the operator that the equipment is at rest in its normal position.

In order to describe the operation of the arrangement shown, it will be assumed that the apparatus unit A'U'32 is open and that the dispatcher desires to close this apparatus unit. Since each group of indicating lamps is lighted to indicate the position of the corresponding apparatus unit, the green lamp LG32 is lighted. The circuit of lamp LG32 is from the positive terminal of battery B, through lamp LG32, conductor 132, contacts a of relay IG32, conductor 128, winding of relay IG32, to the negative terminal of battery B.

After first observing that the start lamp STL is lighted, the dispatcher then operates the select key SK32, which is individual to the apparatus unit A'U'32, so as to close the contacts a and c of the select key. The closing of the contacts c of the select key SK32 completes a circuit from the positive terminal of battery B through the contacts bb of relay C3, conductor 129, contacts b of relay RT2, conductor 130, contacts d of relay GI, conductor 131, contacts c of select key SK32, conductor 134, winding of relay G4, conductor 135, winding of relay GM, to the negative terminal of battery B.

By closing its contacts e, group relay G4 completes a notching circuit for the operating magnet 4FM of group finder switch 4F from the negative terminal of battery B through resistor 132, conductor 136, and contacts b of relay H4, to conductor 137 and from the negative terminal of battery B through the winding H4B of relay H4 to conductor 137, and then through contacts b of operating magnet 4FM, conductor 138, winding H4A of relay H4 and operating magnet 4FM in parallel, conductor 139, contacts e of relay G4, conductor 140, contacts b of relay SI, conductor 141, contacts b of relay C2, conductor 142, contacts d of relay C3 to the positive terminal of battery B. Operating magnet 4FM, by opening its contacts b, effects the interruption of the circuit just described so that the magnet 4FM is intermittently energized to move the switch 4F from whatever position it may be in to the position corresponding to the operated select key SK32 which, in the particular arrangement shown in the drawings, is position 16. When the finder switch 4F reaches its position 16, a short-circuit is completed around the operating magnet 4FM and winding H4A of the holding relay H4 so that the relay H4 picks up because only its winding H4B is energized. This circuit of winding H4B is from the negative terminal of battery B through winding H4B, conductor 137, contacts b of magnet 4FM, conductor 138, contacts g of group relay G4, conductor 144, wiper and contact 16 of contact bank 4FI, conductor 145, contacts a of select key SK32, conductor 146, contact 16 and wiper of contact bank 4F2, conductor 147, contacts i of group relay G4, conductor 148, contacts d of relay CI, conductor 149, contacts dd of relay C3 to the positive terminal of battery B.

When the group finder switch 4F reaches position 16, the indication relay IG32 is short-circuited by a circuit extending from conductor 128 through contact 16 and wiper of bank 4F3, conductor 160, contacts c of relay H4, conductor 161, contacts d of relay RIP to the negative terminal of battery B. By opening its contacts a, relay IG32 opens the circuit of green lamp LG32 so that it is no longer lighted.

By closing its contacts i, relay H4 completes a notching circuit for operating magnet MFM of master finder switch MF from the negative terminal of battery B through winding HMB of relay HM to conductor 150 and through resistor 149, and contacts d of relay HM, to conductor 150, then through contacts b of magnet MFM, conductor 151, winding HMA of relay HM and operating magnet MFM in parallel, conductor 152, contacts i of relay H4, conductor 140, contacts b of relay S1, conductor 141, contacts b of C2, conductor 142, contacts d of relay C3 to the positive terminal of battery B. Operating magnet MFM, by opening its contacts b, effects the interruption of the circuit just described so that the magnet MFM is intermittently energized to move the switch MF from whatever position it may be in to its position 16 which, in the particular arrangement shown in the drawings, is the position corresponding to the select key SK32. When the finder switch MF reaches position 16, a short-circuit is completed around the winding HMA and the operating magnet MFM so that the relay HM picks up. This circuit is from the negative terminal of the battery B through winding HMB of relay HM, conductor 150, contacts b of operating magnet MFM, conductor 151, contacts k of relay H4, conductor 154, wiper and contact 16 of contact bank MF1, conductor 145, contacts a of select key SK32, conductor 146, contact 16 and wiper of contact bank 4F2, conductor 147, contacts i of relay G4, conductor 148, contacts d of relay C1, conductor 149, contacts dd of relay C3 to the positive terminal of battery B.

By closing its contacts k, relay HM completes a circuit for relay S1 from positive terminal of battery B, winding of relay S1, conductor 155, contacts k of relay HM, conductor 156, contacts d of relay RC to neutral terminal of battery B. By closing its contacts K relay S1 completes a locking circuit for itself from conductor 155, through contacts K of relay S1, conductor 308, contacts dd of relay D1 to the neutral of battery B. By closing its contacts g, relay S1 completes a starting circuit for the code sender CS from the positive terminal of battery B through the contacts b of the operating magnet CSM, conductor 157, wiper and contact 25 of bank CS3, conductor 158, contacts g of relay S1, conductor 159, winding of operating magnet CSM to the negative terminal of battery B.

By opening its contacts b, the magnet CSM opens its own energizing circuit so that the magnet becomes deenergized and moves the code sender CS to its position 1. In positions 1 and 2 of the code sender CS, a notching circuit is completed for the magnet CSM through its contacts b, conductor 157, wiper and contacts 1 and 2 of bank CS3, conductor 159, and winding of magnet CSM so as to cause the code sender CS to move to position 3. In positions 3 to 15 inclusive of sender CS a circuit is completed for a relay T through contacts b of the magnet CSM, conductor 157, wiper and contacts 3 to 15 of bank CS3. Relay T, by closing its contacts a, completes an energizing circuit for the magnet CSM which, in turn, by opening its contacts b, interrupts the energizing circuit of the relay T. Therefore a notching circuit is completed for the magnet CSM to move the switch CS from position 3 to position 16, and during this movement the code sender effects the transmission, over the line conductors L1 and L2, of the select code which has been set up by the energized group relay G4 and the position of the master finder switch MF. The polarity of the first two impulses of the select code is determined by the energized group relay and the next four impulses of the select code are determined by the position of the master finder switch MF. Since the group relay G4 is energized and the finder switch MF is in its position 16 as a result of the operation of the select key SK32, the following circuits are completed as the code sender CS moves from position 3 to position 15.

When the code sender reaches position 4, a circuit is completed for the relay N from the negative terminal of battery B through the winding of relay N, conductor 162, contacts gg of relay G4, conductor 163, wiper and contact 4 of bank CS5, conductor 164, contacts b of relay D1, conductor 165; contacts b of relay LN, contacts b of relay LP to the neutral terminal of battery B. Relay N, by closing its contacts g, connects the negative terminal of battery B to the line conductor L1 and by closing its contacts e connects the neutral of battery B to the line L2 so that a negative impulse is transmitted over the line conductors L1 and L2 to the remote station. When the code sender CS reaches position 6 a circuit is completed for the relay N from the negative terminal of battery B through the winding of relay N, conductor 162, contacts ii of relay G4, conductor 168, wiper and contact 6 of bank CS5, conductor 164, contacts b of relay D1, conductor 165, contacts b of relay LN, contact b of relay LP to the neutral terminal of battery B. Therefore, the relay N is again energized to effect the transmission of another negative impulse to the remote station. When the code sender CS reaches position 8, another circuit is completed for the relay N to effect the transmission of another negative impulse to the remote station. This energizing circuit of relay N includes the conductor 162, wiper and contact 16 of bank MF3, conductor 169, and wiper and contact 8 of bank CS5. When the code sender CS reaches position 10, another circuit is completed for the relay N through wiper and contact 10 of bank CS5, conductor 170, and wiper and contact 16 of bank MF4 so as to effect the transmission of another negative impulse to the remote station. When the code sender CS reaches position 12, another circuit is completed for the relay N through the wiper and contact 12 of bank CS5, conductor 171, and wiper and contact 16 of bank MF5, so that another negative impulse is transmitted to the remote station. When code sender CS reaches position 14, another energizing circuit is completed for relay N through the wiper and contact 14 of bank CS5, conductor 172, and wiper and contact 16 of bank MF6 so that the relay N is again energized to effect the transmission of another negative impulse to the remote station. Therefore, as a result of the operation of the code sender CS a series of six negative impulses is transmitted to the remote station to effect the selection of the apparatus unit A'U'32.

As soon as the code sender CS leaves its normal position 25 the heretofore traced check circuit through the line conductors L1 and L2 and the polarized relays L and L' is opened by the wiper of bank CS1 leaving its contact 25. The opening of this check circuit causes the relay L at the dispatcher's office to open its contacts a and thereby effect the deenergization of the relay LN. By opening its contacts a, the relay LN removes a short-circuit from around the winding of the relay RL so that this relay is energized in series with the relay RO. This series circuit is from the negative terminal of battery B through the winding RO, conductor 120 contacts a of relay RO, conductor 174, winding of relay RL, conductor 175, contacts f of relay D1 to the positive terminal of battery B.

At the remote station the opening of the normal check circuit causes the relay L' to open its contacts b and thereby effect the deenergization of the relay L'P'. By opening its contacts e, relay L'P' removes a short-circuit from around the winding of the relay R'L' so that this relay is energized in series with the winding of relay R'O'. This circuit is from the positive terminal of batery B' through contacts f of relay D'l, conductor 176, winding of relay R'L', conductor 177, contacts a of relay R'O', conductor 117, winding of relay R'O' to the negative terminal of battery B'. By opening its contacts d, relay R'L' interrupts the heretofore traced circuit for the relay N'O'. By opening its contacts e and g and closing its contacts b, relay N'O' changes the connections of the line conductors L1 and L2 at the remote station so that the circuit of the polarized relay L' is from the line conductor L1 through the contacts d of relay P', conductor 112, winding of relay L', conductor 113, contacts b of relay N'O', conductor 179, wiper and contact 25 of bank CS1, conductor 106, contacts d of relay N to line conductor L2.

When the first impulse of the select code is received at the remote station, the negative impulse flows through the winding of the relay L' and causes this relay to close its contacts a, thereby completing an energizing circuit for the relay L'N' through conductor 180. By closing its contacts e, relay L'N' completes an energizing circuit for relay R'N'1 from the positive terminal of battery B' through the contacts e of relay L'N', conductor 181, contacts c of relay R'L', conductor 182, contacts d of relay R'T'1, conductor 183, winding of relay R'N'1 to the negative terminal of battery B'. When the first impulse is removed from the line conductors, the relays L' and L'N' become deenergized so that the relay R'T'1 is energized in series with the relay R'N'1. This series circuit is from the positive terminal of battery B' through contacts f of relay D'1, conductor 176, winding of relay R'T'1, conductor 184, contacts a of relay R'N'1, conductor 183, winding of relay R'N'1 to the negative terminal of battery B'. The energization of the relay R'T'1 transfers the connection so that the second impulse of the select code selectively controls the relays R'P'2 and R'N'2 instead of the relays R'P'1 and R'N'1.

Since the second impulse of the select code is also a negative impulse, it effects the energization of the relays L' and L'N' in the manner above-described. By closing its contacts e, the relay L'N' now completes a circuit through conductor 181, contacts f of relay R'T'2, conductor 185, contacts g of relay R'T'1, conductor 186, winding of relay R'N'2 to the negative terminal of the battery. When this second impulse is removed from the line wires, a series circuit is completed for the relays R'N'2 and R'T'2 from the positive terminal of battery B' through contacts f of relay D'1, conductor 176, winding R'T'2A' of relay R'T'2, conductor 187, contacts a of relay R'N'2, conductor 186, winding of relay R'N'2 to the negative terminal of battery B'. The energization of winding R'T'2A' of relay R'T'2 in series with the relay R'N'2 transfers the connections so that the third impulse of the select code selectively controls the relays R'P'3 and R'N'3.

Since the third impulse is a negative impulse, the relays L' and L'N' are again energized and the relay L'N', by closing its contacts e, completes an energizing circuit for the relay R'N'3 through the conductor 181, contacts g of relay R'T'2, conductor 188, contacts b of R'T'3, conductor 189, and winding of relay R'N'3 to the negative terminal of battery B'. When the third impulse is removed from the line conductors, a series circuit is completed through the winding of relays R'N'3 and R'T'3 from the positive terminal of battery B' through contacts f of relay D'1, conductor 176, winding of relay R'T'3, conductor 190, contacts a of relay R'N'3, conductor 189, winding of relay R'N'3 to the negative terminal of battery B'. The energization of the relay R'T'3 transfers the connections so that the fourth impulse of the select code selectively controls the relays R'P'4 and R'N'4.

Since the fourth impulse of the select code is a negative impulse, the relays L' and L'N' are again energized and relay L'N', by closing its contacts e, completes an energizing circuit for the relay R'N'4 through conductor 181, contacts b of relay R'T'4, conductor 191, contacts e of relay R'T'3, conductor 192, winding of relay R'N'4 to the negative terminal of battery B'. When the fourth impulse is removed from the line conductors, a series energizing circuit is completed through the windings of relays R'N'4 and R'T'4 from the positive terminal of battery B' through contacts f of relay D'1, conductor 176, winding of relay R'T'4, conductor 193, contacts a of relay R'N'4, conductor 192, winding of relay R'N'4 to the negative terminal of battery B'. The energization of the relay R'T'4 transfers the connection so that the fifth impulse of the select code selectively controls the relays R'P'5 and R'N'5.

Since the fifth impulse of the select code is a negative impulse, the relays L' and L'N' are again energized and relay L'N', by closing its contacts e, completes an energizing circuit for the relay R'N'5 through conductor 181, contacts c of relay R'T'4, conductor 194, contacts b of relay R'T'5, conductor 195, and winding of relay R'N'5 to the negative terminal of battery B'. When the fifth impulse is removed from the line conductors a series energizing circuit is completed for the windings of relays R'N'5 and R'T'5 from the positive terminal of battery B' through the contacts f of relay D'1, conductor 176, winding of relay R'T'5, conductor 196, contacts a of relay R'N'5, conductor 195, winding of relay R'N'5 to the negative terminal of battery B'. The energization of the relay R'T'5 transfers the connections so that the sixth impulse of the select code selectively controls the relays R'P'6 and R'N'6.

Since the sixth impulse of the select code is also a negative impulse, the relays L' and L'N' are again energized and the relay L'N', by closing its contacts e, completes an energizing circuit for the relay R'N'6 through conductor 181, contacts d of relay R'T'6, conductor 197, contacts e of relay R'T'5, conductor 198, and winding of relay R'N'6 to the negative terminal of battery B'. When the sixth impulse is removed from the line conductors, a series energizing circuit is completed for the winding of relays R'N'6 and R'T'6 from the positive terminal of battery B' through contacts f of relay D'1, conductor 176, winding of relay R'T'6, conductor 199, contacts a of relay R'N'6, conductor 198, winding of relay R'N'6 to the negative terminal of the battery B'.

Therefore, as a result of the select code, relays R'N'1, R'T'1, R'N'2, R'T'2, R'N'3, R'T'3, R'N'4, R'T'4, R'N'5, R'T'5, R'N'6 and R'T'6 are energized. When the relay R'T'1 is energized in response to the removal of the first impulse of the select code, a circuit is completed for the relay C'3 from the neutral terminal of battery B' through the winding of the relay C'3, conductor 200, contacts m of relay R'T'I, conductor 201, contacts b of relay S'I, conductor 202, contacts h of relay D'I to the positive terminal of battery B'. By closing its contacts g, relay C'3 completes a locking circuit for itself.

As a result of the energization of relays R'N'I and R'N'2, an energizing circuit is completed for the group relay G'4 and the relay G'M' from the neutral terminal of battery B' through contacts j of relay D'I, conductor 203, contacts gg of relay C'3, conductor 204, contacts c of relay R'N'I, conductor 205, contacts e of relay R'N'2, conductor 206, winding of relay G'4, conductor 207, contacts b of relay G'I, conductor 208, winding of relay G'M', to the negative terminal of battery B'. By closing its contacts a, relay G'M' completes a locking circuit for the relays G'4 and G'M' by connecting the conductor 203 to conductor 204.

When relay R'T'I becomes energized, the opening of its contacts b interrupts the heretofore described circuit for slow to drop out relay D'2.

During the time that each select impulse is being transmitted, a circuit is completed for time relay D'2 from conductor 101 to the positive terminal of battery B' through contacts g of relay L'N' if the select impulse is negative and through contacts g of relay L'P' if the select impulse is positive. The length of time between successive select impulses is not long enough normally to allow the relay D'2 to return to its normal position. When the relay R'T'6 is energized at the termination of the select code, its contacts e connect the conductor 101 to the positive terminal of battery B', thereby maintaining the relay D'2 energized as long as the relay R'T'6 remains energized.

If for any reason the select code is not properly received at the remote station, the relay D'2 drops out and by closing its contacts b completes an energizing circuit for the relay D'I to effect, in a manner hereinafter described, a reset of the equipment.

When relay R'T'6 becomes energized at the termination of the last impulse of the select code, a circuit is completed from the neutral terminal of battery B', winding of relay C'I, conductor 210, contacts g of relay R'T'6, conductor 202, contacts h of relay D'I to the positive terminal of battery B'.

By closing its contacts g, relay C'I completes a circuit from the positive terminal of battery B' through contacts b of relay D'I, conductor 211, contacts bb of relay S'I, conductor 212, contacts e of relay C'3, conductor 213, contacts g of relay C'I, conductor 214, contacts e of relay G'4, conductor 215, magnet 4F'M', and winding H'4A' of relay H'4 in parallel, conductor 216, contacts b of magnet 4F'M', conductor 217, to the negative terminal of battery B' through contacts b of relay H'4, conductor 218 and resistor 219 and through winding H'4B'. Since the contacts b of the magnet 4F'M' are in this circuit, the magnet 4F'M' is intermittently energized and deenergized to move the finder switch 4F' from whatever position it may be in to position 16, in which position a short-circuit around magnet 4F'M' and winding H'4A' is completed from conductor 216 to the positive terminal of battery B' through contacts g of relay G'4, conductor 219, wiper and contact 16 of bank 4F'I, conductor 220, contacts g of relay R'N'6, conductor 221, contacts i of relay R'N'5, conductor 222, contacts e of relay R'N'4, conductor 223, contacts c of relay R'N'3, conductor 224, contacts e of relay C'I, conductor 211 and contacts b of relay D'I. Relay H'4 picks up and, by closing its contacts c, completes a circuit from the positive terminal of battery B' through contacts b of relay D'I, conductor 211, contacts bb of relay S'I, conductor 212, contacts e of relay C'3, conductor 213, contacts g of relay C'I, conductor 214, contacts c of relay H'4, conductor 225, winding of magnet M'F'M and winding H'M'A' of relay H'M' in parallel, conductor 226, contacts b of magnet M'F'M, conductor 227, to the negative terminal of battery B' through winding H'M'B' and through contacts b of relay H'M', conductor 228, and resistor 229. Since the contacts b of the magnet M'F'M are in this circuit, the magnet M'F'M' is intermittently energized and deenergized to move the finder switch M'F' from whatever position it may be in to its position 16, in which position a short-circuit is completed around the winding of magnet M'F'M' and winding H'M'A' from conductor 226, contacts e of relay H'4, conductor 230, wiper and contact 16 of bank M'F'I to conductor 220, which, as previously described, is connected to the positive terminal of battery B' through the series connected contacts of the energized relays R'N'6, R'N'5, R'N'4, and R'N'3, so that the relay H'M' picks up. By closing its contacts g, relay H'M' completes a circuit for time relay C'2 from the negative terminal of battery B' through contacts i of relay C'I, conductor 285, contacts hh of relay D'I, conductor 286, contacts g of relay H'M', conductor 287, winding of relay C'2 to the neutral of battery B'. By closing its contacts g, relay C'2 completes a circuit for winding R'T'2'B' from the neutral terminal of battery B' through contacts g of relay C'2, conductor 414, contacts d of relay C'4, conductor 460, winding R'T'2B' to the negative terminal of battery B'.

When relay R'T'2 is energized at the termination of the second select impulse, its contacts k complete a notching circuit for magnet C'S'M' of sender C'S' from the positive terminal of battery B', contacts b of magnet C'S'M', conductor 232, wiper and contact 25 of bank C'S'3, conductor 233, contacts a of relay N'C'S', conductor 234, contacts k of relay R'T'2, conductor 235, magnet C'S'M' to the negative terminal of battery B'. This notching circuit causes magnet C'S'M' to move the sender C'S' to its position I. In positions I to 4 of sender C'S' a circuit is completed for relay T' from the positive terminal of battery B', contacts b of magnet C'S'M', conductor 232, wiper and contacts I to 4 inclusive of bank C'S'3, conductor 236, winding of relay T' to the neutral terminal of battery B'. Relay T', by closing its contacts a, completes through conductor 235 an energizing circuit for the operating magnet C'S'M', which in turn, by opening its contacts b, interrupts the circuit of relay T'. Therefore, a notching circuit is completed for the magnet C'S'M' to move the code sender C'S' from its position I to its position 5. As soon as code sender C'S' leaves its normal position 25, the circuit of relay N'C'S' is opened at contact 25 of bank C'S'2.

Sender C'S' remains in position 5 until relay H'M' closes its contacts e and completes an energizing circuit for relay S'I from the positive terminal of battery B' through winding of relay S'I, conductor 237, contacts e of relay H'M', conductor 238, contacts k of relay C'I, conductor 239', contact 5 and wiper of bank C'S'4, conductor 105, contact d of relay D'I to the neutral of battery B'. By closing its contacts c, relay S'I completes a locking circuit for itself between conductors 237 and 105. By closing its contacts cc, relay S'I completes a notching circuit for magnet C'S'M' in position 5 of sender C'S' so as to cause the sender to move to position 6. This notching circuit is from the negative terminal of battery B' through magnet C'S'M', conductor 235, contacts cc of relay S'I, conductor 235', contact 5 and wiper of bank C'S'3, conductor 232, contacts b of magnet C'S'M' to the positive terminal of battery B'. Since the contacts 6 of bank C'S'3 is connected directly to the conductor 235, a notching circuit is completed for the operating magnet C'S'M' to move the code sender from position 6 to position 7. When the code sender C'S' is in positions 7 to 19, inclusive, a circuit is completed for the relay T' through the wiper and contacts of bank C'S'3, to energize again the relay T' and thereby complete a notching circuit for the magnet C'S'M' so that the code sender C'S' is moved from position 7 to position 20.

As the code sender IS' moves from position 7 to position 20, it effects the transmission over the line conductors LI and L2 of the check code which has been set up by the energized group relay G'4 and the position of the master finder switch M'F'. In the arrangement shown, the check and select codes are identical so that the check code for the apparatus unit A'U'32 consists of six negative impulses.

When the code sender C'S' is in position 8, a circuit is completed for the relay N' from the negative terminal of battery B' through the winding of the relay N', conductor 239, contacts c of relay G'4, conductor 240, wiper and contact 8 of bank C'S'4, conductor 105, contacts d of relay D'I to the neutral terminal of battery B'. Relay N', by closing its contacts e, connects the neutral of battery B' to the line conductor L2 and by closing its contacts g connects the negative terminal of battery B' to the line conductor LI so that a negative impulse is transmitted over the line conductors while the relay N' is energized. By opening its contacts d, relay N' disconnects the line relay L' from across the line conductor LI and L2.

In position 10 of the code sender C'S', a circuit is completed for the relay N' through conductor 239, contacts ee of relay G'4, conductor 241, contact 12 and wiper of bank C'S'4, conductor 105, and contacts d of relay D'I to the neutral terminal of battery B' so that another negative impulse is transmitted over the line conductors.

In position 12 of the code sender C'S', another circuit is completed for the relay N' through the wiper and contacts 12 of bank C'S'4, conductor 244, and wiper and contact 16 of bank M'F'3.

In position 14 of code sender C'S', another circuit is completed for the relay N' through wiper and contact 14 of bank C'S'4, conductor 245 and wiper and contact 16 of bank M'F'4.

In position 16 of the code sender C'S', another circuit is completed for the relay N' through the wiper and contact 16 of bank C'S'4, conductor 246 and wiper and contact 16 of bank M'F'5.

In position 18 of the code sender C'S', another circuit is completed for the relay N' through the wiper and contact 18 of bank C'S'4, conductor 247 and wiper and contact 16 of bank M'F'6.

When the code sender C'S' reaches position 20, another impulse is transmitted over the line conductor LI and L2 of a character corresponding to the position of the selected apparatus unit. When the relay S'I becomes energized in response to the stopping of finder switch M'F', it completes a circuit for either the relay I'T' or the relay I'C', depending upon the position of the selected apparatus unit. Since in the arrangement shown in the drawings, the apparatus unit A'U'32 is assumed to be open, a circuit is completed by the relay S'I for the relay I'T' from the negative terminal of battery B' through operating winding I'T'A' of relay I'T', conductor 249, contacts b of relay I'C', conductor 250, contacts e of relay S'I, conductor 251, contact b of relay R'I'N', conductor 252, contacts i of relay H'4 conductor 253, contact and wiper 16 of bank 4F'4, conductor 254, contacts b of apparatus unit A'U'32, to the positive terminal of battery B'. By closing its contacts a, relay I'T' completes a circuit for holding winding I'T'B' from positive terminal of battery B', through winding I'T'B', contacts a of relay I'T' conductor 452, contacts d of relay R'I'T' conductor 453, contacts bb of relay D'I to the neutral terminal of battery B'. Winding I'T'B' therefore maintains the relay I'T' energized until an indication check impulse is received which effects the opening of contacts d of relay R'I'T' so as to insure that an indication impulse corresponding to an open position of the apparatus unit is transmitted although the apparatus unit may be reclosed after the relay I'T' is energized and before the indicator impulse is transmitted. Therefore, when the code sender C'S', reaches its position 20, a circuit is completed from the positive terminal of battery B' through the winding of the relay P', conductor 256, contacts g of relay I'T', conductor 257, contacts 16 and wiper of bank C'S'5, conductor 258, contacts b of relay S'3, conductor 259, contacts d of relay L'N', conductor 260, contacts b of relay L'P', conductor 261, contacts a of relay C'2, conductor 262, contact 20 and wiper of bank C'S'4, conductor 105 and contacts d of relay D'I to the neutral of battery B'. Relay P', by closing its contacts g, connects the neutral of battery B' to the line conductor L2 and by closing its contacts c connects the positive terminal of battery B' to the line conductor LI so that a positive indication impulse is transmitted to the dispatcher's office, thereby indicating that the selected apparatus unit A'U'32 is in its open position. By opening its contacts d, relay P' disconnects the line relay L' at the substation from across the line conductors LI and L2.

When the code sender C'S' reaches its position 20 a circuit is also completed from the positive terminal of battery B' through contacts e of relay I'T' conductor 264, winding of time relay S'2, to conductor 259, which is connected to the neutral terminal of the battery B' in the manner just described. After being energized for a predetermined length of time relay S'2 closes its contacts e and completes through contacts e of relay I'T' and conductor 264 an energizing circuit for a time relay S'3 which, after being energized for a predetermined time, opens at its contacts b the heretofore described circuit for the relay P' so as to remove the indication impulse from the line wires. By closing its contacts e, relay S'3 connects the conductor 259 to the conductor 261, thereby completing a shunt circuit around the contacts b of the relay L'P' and contacts d of relay L'N'.

Each of the negative check impulses flows through the polarized relay L at the dispatcher's office from line conductor L2 through contacts d of relay N, conductor 107, wiper and contact 16 of bank CS1, conductor 108, contacts b of emergency reset key ERK, conductor 109, winding of polarized relay L, conductor 110, contacts d of relay P to the line conductor L1. The current through the winding of relay L is in such a direction as to cause the relay to close its contacts a and thereby complete the heretofore described energizing circuit for the relay LN.

When relay LN is energized in response to the first impulse of the check code, a circuit is completed from the positive terminal of battery B through contacts b of relay RC, conductor 118, contacts a of relay LN, conductor 119, contacts c of relay RL, conductor 266, contacts b of relay RT1, conductor 267, winding of relay RN1 to the negative terminal of battery B. When the first impulse of the check code is removed from the line conductors so that relays L and LN are deenergized, a series energizing circuit is completed for the relays RN1 and RT1 from the positive terminal of battery B through contacts f of relay D1, conductor 175, winding of relay RT1, conductor 268, contacts a of relay RN1, conductor 267, winding of relay RN1 to the negative terminal of battery B. The energization of relay RT1 transfers the connections so that the second impulse of the check code controls the energization of either the relay RN2 or the relay RP2.

When the second impulse of the check code effects the energization of the relays L and LN, a circuit is completed from the positive terminal of battery B through contacts b of relay RC, conductor 118, contacts a of relay LN, conductor 119, contacts f of relay RT2, conductor 269, contacts e of relay RT1, conductor 270, winding of relay RN2 to the negative terminal of battery B. When the second impulse is removed from the line conductors so that the relays L and LN become deenergized, a series energizing circuit is completed for the windings of relay RN2 and RT2 from the positive terminal of battery B through contacts f of relay D1, conductor 175, winding of relay RT2, conductor 271, contacts a of relay RN2, conductor 270, winding of relay RN2 to the negative terminal of battery B. The energization of relay RT2 transfers the connections so that the third impulse of the check code effects the energization of either the relay RN3 or the relay RP3. Also by closing its contacts a, relay RT2 completes through conductor 268' and contacts a of relay HM in series a short circuit around the contacts f of relay D1 in the holding circuits of the registering relays RO, RL, RP1, RT1, etc.

When the third impulse of the check code effects the energization of the relays L and LN, a circuit is completed from the positive terminal of battery B through the contacts b of relay RC, conductor 118, contacts a of relay LN, conductor 119, contacts e of relay RT2, conductor 273, contacts b of relay RT3, conductor 274, winding of relay RN3 to the negative terminal of battery B. When the third impulse is removed from the line conductors so that the relays L and LN are deenergized a series energizing circuit is completed through the windings of relays RN3 and RT3 from the positive terminal of battery B through contacts f of relay D1, conductor 175, winding of relay RT3, conductor 275, contacts a of relay RN3, conductor 274, winding of relay RN3 to the negative terminal of battery B. The energization of the relay RT3 transfers the connections so that the fourth impulse of the check code effects the energization of the relay RN4 or RP4.

When the fourth impulse of the check code effects the energization of the relays L and LN, a circuit is completed from the positive terminal of battery B through contacts b of relay RC, conductor 118, contacts a of relay LN, conductor 119, contacts d of relay RT4, conductor 276, contacts e of relay RT3, conductor 277, winding of relay RN4 to the negative terminal of battery B. When the fourth impulse of the check code is removed from the line conductors, a series energizing circuit is completed for the windings of relay RN4 and RT4 from the positive terminal of the battery through contacts f of relay D1, conductor 175, winding of relay RT4, conductor 278, contacts a of relay RN4, conductor 277, winding of relay RN4 to the negative terminal of battery B. The energization of the relay RT4 transfers the connections so that the fifth impulse of the check code effects the energization of the relay RN5 or the relay RP5.

When the fifth impulse of the check code effects the energization of the relays L and LN, a circuit is completed from the positive terminal of battery B through contacts b of relay RC, conductor 118, contacts a of relay LN, conductor 119, contacts e of relay RT4, conductor 279, contacts b of relay RT5, conductor 280, winding of relay RN5 to the negative terminal of battery B. When the fifth impulse of the check code is removed from the line conductors so that the relays L and LN become deenergized a series energizing circuit is completed for the windings of relays RN5 and RT5 from the positive terminal of battery B through contacts f of relay D1, conductor 175, winding of relay RT5, conductor 281, contacts a of relay RN5, conductor 280, winding of relay RN5 to the negative terminal of battery B. The energization of the relay RT5 transfers the connections so that the sixth and last impulse of the check code effects the energization of the relay RN6 or the relay RP6.

When the sixth impulse of the check code effects the energization of the relays L and LN, a circuit is completed from the positive terminal of battery B through contacts b of relay RC, conductor 118, contacts a of relay LN, conductor 119, contacts d of relay RT6, conductor 282, contacts e of relay RT5, conductor 283, winding of relay RN6 to the negative terminal of battery B. When the sixth impulse is removed from the line conductors so that the relays L and LN are deenergized a series energizing circuit is completed through the windings of the relays RN6 and RT6 from the positive terminal of battery B through contacts f of relay D1, conductor 175, winding of relay RT6, conductor 284, contacts a of relay RN6, conductor 283, winding of relay RN6 to the negative terminal of battery B. The energization of the relay RT6 transfers the connections so that the indication impulse effects the energization of either the relay RIP or the relay RIN in a manner hereinafter described.

If the first two impulses of the select and check codes agree, a secondary holding circuit is completed for the relays G4 and GM by the relays RN1 and RN2 before the original energizing circuits for these relays is opened by the relay RT2 opening its contacts b. This secondary holding circuit for the relays G4 and GM is from the positive terminal of battery B through contacts ee of relay G4, conductor 188, contacts d of relay D1, conductor 189, contacts dd of relay G1, conductor 190, contacts c of relay RN1, conductor 191, contacts e of relay RN2, conductor 134, winding of relay G4, conductor 135, winding of relay GM to the negative terminal of battery B.

When relay RT6 is energized at the termination of the last impulse of the check code, a circuit is completed from the neutral terminal of battery B through wiper and contact 16 of bank CS6, conductor 300, contacts e of relay RT6, conductor 301, winding of relay C1, to the negative terminal of battery B. By closing its contacts e, relay C1 completes an energizing circuit for time relay circuit C2 from the negative terminal of battery B through winding of relay C2, conductor 310, contacts e of relay C1, to the neutral of battery B.

By closing its contacts k, relay C2 completes a circuit for lighting the amber lamp LA32 associated with the operated select key SK32 so as to notify the dispatcher that the proper apparatus unit has been selected. The circuit of lamp LA32 is from the positive terminal of battery B through lamp LA32, conductor 448, contact 16 and wiper of bank 4F5, conductor 449, contacts g of relay H4, conductor 450, contacts k of relay C2 to the negative terminal of battery B.

If the last four impulses of the select and check codes agree, a secondary holding circuit is completed for the holding relays HM and H4 before the original energizing circuit for these relays is opened at the contacts b of relay C2 a predetermined time after the termination of the check code. The secondary holding circuit for the relay HM is from the negative terminal of battery B through winding HMB of relay HM, conductor 150, contacts b of magnet MFM, conductor 151, contacts k of relay H4, conductor 154, wiper and contact 16 of bank MF1, conductor 145, contacts g of relay RN6, conductor 194, contacts i of relay RN5, conductor 195, contacts e of relay RN4, conductor 196, contacts c of relay RN3, conductor 197, contacts g of relay RT6, conductor 198, contacts ff of relay D1, conductor 199, contacts b of relay S3 to the positive terminal of battery B. A similar secondary holding circuit is completed for the relay H4 from the negative terminal of battery B through winding H4B, conductor 137, contacts b of magnet 4FM, conductor 138, contacts g of relay G4, conductor 144 wiper and contact 16 of bank 4F1, to conductor 145, which is connected to the positive terminal of battery B in the manner above described.

When the relay C2 closes its contacts a, another holding circuit is completed for windings HMB and H4B from conductor 145 through contacts a of select key SK32, conductor 146, contact 16 and wiper of bank 4F2, conductor 147, contacts i of relay G4, conductor 148, contacts c of relay HM, conductor 148', contacts a of relay C2, conductor 149, contacts dd of relay C3 to the positive terminal of battery B'.

When the indication impulse, which follows the check code, is a positive impulse, it causes the polarized relay L at the dispatcher's office to close its contacts b thereby to complete an energizing circuit for the relay LP. By closing its contacts e, relay LP completes a circuit for relay RIP from the positive terminal of battery B through contacts b of relay RC, conductor 118, contacts e of relay LP, conductor 310, contacts i of relay C1, conductor 311, winding of relay RIP, to the negative terminal of battery B. By closing its contacts e, relay RIP completes an energizing circuit for the green indicating relay IG32 from the positive terminal of battery B through resistor 316, conductor 317, contacts g of relay GM, conductor 318, contacts i of relay C2, conductor 319, contacts b of relay RIT, conductor 320, contacts e of relay RIP, conductor 161, contacts c of relay H4, conductor 160, wiper and contact 16 of bank 4F3, conductor 128, winding of relay IG32 to the negative terminal of battery B. By closing its contacts a, relay IG32 completes a circuit for itself through the lamp LG32 in parallel with the resistor 316. The lighting of the lamp LG32 informs the dispatcher that the selected apparatus unit A'U'32 is in its open position.

In case there is a faulty interlock on the selected apparatus unit so that no indication impulse is transmitted after the check code, the associated green and red lamps remain extinguished. The continuous lighting of an amber lamp with its associated green and red lamps extinguished informs the dispatcher that the selected apparatus unit has a fault interlock.

When the positive indication impulse is removed from the line conductors L1 and L2 so that the relay LP becomes deenergized, a series energizing circuit is completed for relays RIP and RIT from the positive terminal of battery B through winding of relay RIT, conductor 312, contacts d of relay MO2, conductor 313, contacts i of relay RT6, conductor 314, contacts d of relay LN, conductor 315, contacts i of relay RIP, conductor 311, winding of relay RIP, to the negative terminal of battery B. By opening its contacts b, relay RIT opens the original energizing circuit for indicating relay IG32, but sufficient current flow through this relay and the lamp LG32 in series to maintain the relay in its energized position and the lamp IG32 lighted.

By closing its contacts e, relay RIT completes an energizing circuit for the relay P to cause a positive indication check impulse to be transmitted over the line conductors L1 and L2. This circuit for the relay P is from the positive terminal of the battery B through the winding of the relay P, conductor 321, contacts g of relay RIP, conductor 322, contacts e of relay RIT, conductor 323, contacts d of relay S3, conductor 324, contacts g of relay C2, conductor 325, contact 16 and wiper of bank CS5, conductor 164, contacts b of relay D1, conductor 165, contacts b of relay LN, contacts b of relay LP to the neutral of battery B. Relay P, by closing its contacts e, connects the positive terminal of the battery B to the line conductor L1, and by closing its contacts g, connects the neutral of battery B to the line L2 so that a positive impulse is transmitted over the line conductors L1 and L2 to the remote station.

By closing its contacts i, relay RIT completes an energizing circuit for the time relay S2 from the positive terminal of battery B through contacts c of relay RIP, conductor 327, winding of time relay S2, conductor 328, contacts i of relay RIT, conductor 329, contact 16 and wiper of bank CS4, conductor 324, which is connected to the neutral terminal of battery B in the manner just described. After being energized for a predetermined time, relay S2 completes through its contacts e an energizing circuit for the time relay S3 from the positive terminal of battery B through contacts c of relay RIP, conductor 327, winding of relay S3, conductor 330, contacts e of relay S2 to the neutral terminal of battery B. After being energized for a predetermined time, relay S3 opens its contacts d in the heretofore traced circuit for the relay P so as to remove the indication check impulse from the line conductors L1 and L2. Relays S2 and S3, however, remain energized until either the relay LP or LM is again energized in response to another indication impulse.

At the remote station the indication check impulse energizes the relay L' so that it closes its contacts b and completes the energizing circuit for the relay L'P'. By closing its contacts e, relay L'P' completes a circuit from the positive terminal of battery B' through contacts e of relay L'P', conductor 116, contacts f of relay R'I'T', conductor 332, contacts i of relay R'T'6, conductor 333, contacts b of relay C'6, conductor 334, winding of relay R'I'P' to the negative terminal of battery B'. When the indication check impulse is removed from the line conductors, a series energizing circuit is completed for the windings of the relays R'I'P' and R'I'T' from the positive terminal of battery B' through the contacts f of the relay D'1, conductor 176, contacts i of relay I'T', conductor 335, winding of relay R'I'T', conductor 336, contacts c of relay R'I'P', conductor 334, winding of relay R'I'P' to the negative terminal of battery B'. The energization of relay R'I'T' prepares the circuits for the trip relay R'C'P' and the closing relay R'C'N so that they are completed when the dispatcher transmits either a negative tripping or a positive closing impulse over the line conductors. By opening its contacts d, relay R'I'T' interrupts the heretofore described circuit for holding winding I'T'B' of relay I'T'.

Relay R'I'P', by closing its contacts g, completes a circuit from the positive terminal of battery B' through contacts g of relay R'I'P', conductor 337, contacts c of relay I'T', conductor 338, winding of time delay relay C'4 to the neutral terminal of battery B'. By opening its contacts d, relay C'4 opens the heretofore described circuit for winding R'T'2B' of relay R'T'2. If the indication check impulse agrees in polarity with the indication impulse, which is indicated by the simultaneous energization of relays R'I'P' and I'T' or of relays R'I'N and I'C', and the indication check impulse is sufficiently long, the time delay relay C'4 opens its contacts b in an energizing circuit for reset relay D' before the relay R'I'T' is energized to close its contacts i upon the removal of the indication check impulse from the line conductors. If for any reason the relay C'4 does not open its contacts b before the relay R'I'T' becomes energized a circuit is completed for the reset relay D'1 from the neutral terminal of battery B' through the winding of the relay D'1, conductor 339, contacts b of relay C'4, conductor 340, contacts i of relay R'I'T' to the positive terminal of battery B'. The energization of the relay D'1 resets the equipment to its normal position in a manner which will be hereinafter described. The length of the indication check impulse depends upon the operating time of the time delay relays S2 and S3 in the dispatcher's office and the operating times of these relays is normally set so that the indication check impulse is of sufficient duration to allow the relay C'4 to pick up before the relay R'I'T' is energized, in case the polarites of the indication impulse and the indication check impulse agree.

After the amber light LA32 is lighted, and the green lamp LG32 is relighted, the dispatcher moves the check key DK32 to its opposite position, thereby connecting through its contacts a, the white disagreement lamp LW32 in parallel with green lamp LG32.

The dispatcher then operates the master closing key MCK so as to cause a long negative closing impulse to be transmitted over the line conductors L1 and L2 to the remote station. The closing of the contacts a of the master closing key MCK completes an energizing circuit for the time relay MO1 from the positive terminal of battery B through the contacts a of key MCK, conductor 341, contacts e of relay S3, conductor 342, contacts b of relay MO2, conductor 343 winding of relay MO1, to the negative terminal of battery B. By closing its contacts a, relay MO1 completes an energizing circuit for the relay N from the negative terminal of battery B through the winding of relay N, conductor 162, contacts c of key MCK, conductor 346, contacts a of relay MO1, conductor 324, contacts g of relay C2, conductor 325, contact 16 and wiper of bank CS5, conductor 164, contacts b of relay D1, conductor 165, contacts b of relay LN, contacts b of relay LP, to the neutral terminal of battery B. By closing its contacts i, relay N completes a locking circuit for itself from conductor 162 through contacts i of relay N, conductor 348, contacts d of key MTK to conductor 346. The energization of relay N causes, in the manner heretofore described, a negative impulse to be transmitted over the line conductors L1 and L2 to the remote station.

The negative operate impulse is not removed from the line conductors L1 and L2 until a predetermined time after the master closing key MCK is released so that its contacts a are opened in the original energizing circuit of relay MO1. The relay MO1 remained energized however because a series energizing circuit for the windings of relays MO1 and MO2 is then completed from the positive terminal of battery B through winding of relay MO2, conductor 344, contacts c of relay MO1, conductor 343, winding of relay MO1, to the negative terminal of battery B. A predetermined time after relay MO2 is energized, it closes its contacts g to complete a short-circuit around the winding of relay MO1. Relay MO1 then becomes deenergized, and, by opening its contacts c, interrupts the energizing circuit of relay MO2. Relay MO2, by opening its contacts e, which are connected in parallel with contacts a of relay MO1, interrupts the circuit of relay N to remove the negative operating impulse from the line conductors L1 and L2. It will be apparent that whenever a master operating key is closed long enough to cause relay MO1 to pick up and effect the transmission of an operating impulse, this operating impulse will always be a long impulse because it cannot be terminated until time relay MO2 picks up. This arrangement of relays MO1 and MO2 insures that a short reset impulse cannot be transmitted in response to a momentary closing of a master operating key.

The opening of contacts d of relay MO2, when it becomes energized, interrupts the heretofore described series circuit for relays RIP and RIT. Relay RIP, by opening its contacts e and closing its contacts d effects the deenergization of the indication relay IG32 so that the associated green lamp LG32 is extinguished.

Relay RIT, by opening its contacts $i$, interrupts the heretofore described circuits for the time relays S2 and S3 so that they become deenergized. Relay S3, by opening its contacts $e$ in the energizing circuit of relay MOI, prevents any more operating impulses from being transmitted until after an indication impulse has been transmitted from the remote station to the dispatcher's office and has effeced the energization of relay RIT.

At the remote station this negative control impulse operates the polarized relay L' and the relay L'N'. By closing its contacts $e$, relay L'N' completes a circuit from the positive terminal of battery B' through the contacts $e$ of the relay L'N', conductor 181, contacts $g$ of relay R'I'T', conductor 349, winding of relay R'C'N', conductor 350, contacts $h$ of relay R'C'T, conductor 351, contacts $g$ of relay C'4 to the negative terminal of battery B'. By closing its contacts $a$, relay R'C'N' completes a circuit from the positive terminal of battery B' through the contacts $a$ of relay R'C'N', conductor 355, contacts $b$ of relay R'C.'T', conductor 356, winding of relay C'5 to the neutral terminal of battery B'. The control impulse must be long enough to allow the time delay relay C'5 to operate. By opening its contacts $f$, relay C'5 presents a series energizing circuit for relays R'C'N' and R'C'T' from being completed at the termination of the operate impulse. By closing its contacts $d$, relay C'5 completes a circuit from the positive terminal of battery B' through the contacts $d$ of relay C'5, conductor 357, contacts $c$ of relay R'C'N', conductor 358, contacts $ee$ of relay S'I, conductor 359, contacts $ii$ of relay G'4 conductor 360, wiper and contacts 16 of bank 4F'6, conductor 361, closing coil C'C'32 to the negative terminal of the battery. The energization of the closing coil C'C'32 closes the apparatus unit A'U'32, in which position it is held by any suitable means, such as the latch L'32. Preferably the apparatus unit A'U'32 is provided with a suitable trip free arrangement, examples of which are well known in the art whereby the unit may open while the closing coil C'C'32 is still energized.

As soon as the relay C'5 closes its contacts $c$, a circuit is completed from the neutral of battery B' through the winding of relay C'6, conductor 362, contacts $c$ of relay C'5, conductor 363, contacts $i$ of relay L'N' to the positive terminal of battery B'. By closing its contacts $e$, relay C'6 completes a locking circuit for itself around the contacts $c$ of the relay C'5. Therefore, after the relay C'5 has operated, the relay C'6 remains energized thereafter until the control impulse is removed from the line conductors and thereby effects the deenergization of the relays L'N'. The relay C'6, when energized, opens at its contacts $d$ and $b$ respectively the energizing circuits for the relays R'I'N' and R'I'P' so that both of these relays remain deenergized as long as a control impulse continues to be transmitted over the line conductors after the relay C'6 is energized.

When the apparatus unit A'U'32 moves to its closed position, it opens its auxiliary contacts $b$ and closes its auxiliary contacts $a$, thereby disconnecting the conductor 254 from the positive terminal of the battery B' and connecting it to the negative terminal of the battery B'. Since the opening of the auxiliary contacts $b$ of the apparatus unit A'U'32 interrupts the locking circuit for the associated indication relay I'A'32, which includes conductor 365 and contacts $g$ of relay I'A'32, this relay becomes deenergized. The opening of the auxiliary contacts $b$ of apparatus unit A'U'32 also interrupts the heretofore described circuit for winding I'T'A' of relay I'T'.

By opening its contacts $i$, relay I'T' interrupts the heretofore described series energizing circuit for the windings of the relays R'I'P' and R'I'T' so that these relays become deenergized. The deenergization of R'I'T' effects at its contacts $g$ the deenergization of relays R'C'N' which in turn effects the deenergization of relay C'5 and closing coil C'C'32 although the control impulse has not been removed from the line conductors LI and L2. By opening its contacts $c$, relay I'T' interrupts the heretofore described circuit of the relay C'4 so that this relay becomes deenergized, and cannot be energized again until an indication of the new position of apparatus unit A'U'32 has been sent to the dispatcher's office and the correct indication check impulse has been received at the remote station. By closing its contacts $b$ relay I'T' completes an energizing circuit for winding I'C'A' of the relay I'C' from the positive terminal of battery B' through the winding I'C'A' of the relay I'C', conductor 366, contacts $b$ of relay I'T', conductor 367, contacts $g$ of relay S'I, conductor 368, contacts $b$ of relay R'I'P', conductor 252, contacts $i$ of relay H'4, conductor 253, wiper and contacts 16 of bank 4F'4, conductor 254, contacts $a$ of apparatus unit A'U'32 to the negative terminal of battery B'. By closing its contacts $c$, relay I'C' completes a circuit for its holding winding I'C'B' from the positive terminal of battery B' through winding I'C'B', conductor 454, contacts $c$ of relay I'C', conductor 452, contacts $d$ of relay R'I'T', conductor 453, contacts $bb$ of relay D'I to the neutral terminal of battery B'. By relay I'T' opening its contacts $e$ and relay I'C' closing its contacts $e$, the potential applied to the conductor 264 is reversed so that the current through the coils of time relays S'2 and S'3 reverses and causes these relays to become deenergized.

The indication of the new position of the apparatus unit A'U'32 cannot be sent back to the dispatcher's office until the control impulse has been removed from the line conductors by the dispatcher's opening the contacts of the control key MCK. When the control impulse is removed from the line conductors the relay L'N' becomes deenergized, and by opening its contacts $i$, interrupts the heretofore described holding circuit for relay C'6. Also the deenergization of relay L'N' completes a circuit for relay N' from the negative terminal of battery B', through the winding of the relay N', conductor 239, contacts $g$ of relay I'C', conductor 257, wiper and contact 20 of bank C'S'5, conductor 258, contacts $b$ of relay S'3, conductor 259, contacts $d$ of relay L'N', conductor 260, contacts $b$ of relay L'P', conductor 261, contacts $a$ of relay C'2, conductor 262, contact 20 and wiper of bank C'S'4, conductor 105, contacts $d$ of relay D'I to the neutral of battery B'I. The energization of the relay N' causes a negative indication impulse to be transmitted over the line conductors to indicate that the apparatus unit A'U'32 is in its closed position. At the same time the relay N' is energized, a circuit is completed from the negative terminal of battery B' through the contacts e of the relay I'C', conductor 264, winding of relay S'2, to conductor 259, which is connected to the neutral of battery B' in the manner above described. After being energized for a predetermined length of time, relay S'2 closes its contacts e and thereby completes through contacts d of relay I'C' an energizing circuit for the relay S'3, which, after being energized for a predetermined time, opens its contacts b in the circuit of relay N' to effect the removal of the indication impulse from the line conductors, and closes its contacts e to complete a holding circuit for the relay S'2.

At the dispatcher's office, the negative indication impulse effects the energization of the relays L and LN. By closing its contacts a, relay LN completes a circuit for the relay RIN from the negative terminal of battery B through the winding of the relay RIN, conductor 369, contacts k of relay C1, conductor 119, contacts a of relay LN, conductor 118, contacts b of relay RC to the positive terminal of battery B. By closing its contacts i, relay RIN completes a locking circuit for itself which is energized at the end of the indication impulse from the negative terminal of battery B through the winding of the relay RIN, conductor 369, contacts i of relay RIN, conductor 370, contacts d of relay LP, conductor 314, contacts i of relay RT6, conductor 313, contact d of relay MO2, conductor 312, winding of relay RIT, to the positive terminal of battery B.

By closing its contacts e, relay RIN completes an energizing circuit for indicating relay IR32 from positive terminal of battery B, through resistor 316, conductor 317, contacts g of relay GM, conductor 318, contacts i of relay C2, conductor 319, contacts b of relay RIT, conductor 320, contacts e of relay RIN, conductor 371, contacts e of relay H4, conductor 430 wiper and contact 16 of bank 4F4, conductor 372, winding of relay IR32, to the negative terminal of battery B. By closing its contacts a, relay IR32 completes a circuit for lamp LR32 in parallel with resistor 316. The lighting of lamp LR32 indicates to the dispatcher that the apparatus unit A'U'32 is in its closed position.

By opening its contacts b, relay LN interrupts the heretofore described circuit for relay S2 so that it in turn effects the deenergization of relay S3.

When the indication impulse is removed from the line conductors L1 and L2, the relay LN becomes deenergized and a circuit is completed for the relay N from the negative terminal of battery B through the winding of the relay N, conductor 162, contacts g of relay RIN, conductor 373, contacts g of relay RIT, conductor 323, contacts d of relay S3, conductor 324, contacts g of relay C2, conductor 325, contact 16 and wiper of bank CS5, conductor 164, contacts b of relay D1, conductor 165, contacts b of relay LN, contacts b of relay LP to the neutral of battery B. The energization of the relay N causes a negative indication check impulse to be transmitted over the line conductors L1 and L2.

The closing of the contact b of relay LN also completes a circuit from the negative terminal of battery B through contacts c of relay RIN, conductor 327, winding of relay S2, conductor 328, conductor i of relay RIT, conductor 329, contact 16 and wiper of bank CS4 and conductor 324 which is connected to the neutral of battery B in the manner above described. The closing of the contacts e on S2 completes a circuit for relay S3 which after a predetermined time opens its contacts d in the above traced circuit of relay N to effect the removal of the negative indication check impulse from the line conductors. The relays S2 and S3 however remain energized.

At the substation, the long negative indication check impulse effects the energization of the relays L' and L'N'. By closing its contacts e, relay L'N' completes a circuit from the positive terminal of battery B' through the contacts e of the relay L'N', conductor 181, contacts c of relay R'T'6, conductor 374, contacts b of relay R'I'T', conductor 375, contacts d of relay C'6, conductor 376, winding of relay R'I'N' to the negative terminal of battery B'. As soon as the indication check impulse is removed from the line conductors, a series locking circuit is completed through the windings of the relays R'I'N' and R'I'T' from the positive terminal of battery B', contacts f of relay D'1, conductor 176, contacts i of relay I'C', conductor 335, winding of relay R'I'T', conductor 336, contacts a of relay R'I'N', conductor 376, winding of relay R'I'N' to the negative terminal of battery B'.

By closing its contacts g, relay R'I'N' completes an energizing circuit for the relay C'4 from the neutral terminal of battery B' through the winding of the relay C'4, conductor 338, contacts a of relay I'C', conductor 377, contacts g of relay R'I'N' to the positive terminal of battery B'. If the indication check impulse is of a predetermined duration, relay C'4 has sufficient time to operate before relay R'I'T' is energized upon the removal of the indication check impulse. The energization of relay C'4 completes a circuit from the negative terminal of battery B' through contacts a of selected apparatus unit A'U'32, conductor 254, winding of an indication auxiliary relay IA'32, conductor 365, contact 16 and wiper of bank 4F'3, conductor 378, contacts g of relay H'4, conductor 379, contacts i of relay C'4, conductor 380, contacts e of relay C'2, conductor 381, contacts e of relay R'I'N', conductor 382, resistor 383 to the positive terminal of battery B'. By closing its contacts g, relay IA'32 completes a holding circuit for itself from the conductor 365 to the neutral of battery B'. The circuits at the substation are now in a condition to receive another control impulse if the dispatcher desires to trip the apparatus unit or to receive an impulse to reset the supervisory control apparatus.

In case the dispatcher desires to trip the apparatus unit A'U'32 after it has been closed, he operates the master trip key MTK so as to cause a long positive tripping impulse to be transmitted over the line conductors L1 and L2 to the remote station. The closing of the contacts a of the master trip key MTK completes an energizing circuit for the time relay MO1 from the positive terminal of battery B through contacts a of trip key MTK, conductor 341, contacts e of relay S3, conductor 342, contacts b of relay MO2, conductor 343, winding of relay MO1, to the negative terminal of battery B. By closing its contacts a, relay MO1 completes an energizing circuit for the relay P from the positive terminal of battery B through winding of relay P, conductor 321, contacts c of key MTK, conductor 346, contacts a of relay MO1, conductor 324, contacts g of relay C2, conductor 325, contacts 16 and wiper of bank CS5, conductor 164, contacts b of relay D1, conductor 165, contacts d of relay LN, contacts b of relay LP, to the neutral terminal of battery B. The energization of relay P causes, in the manner heretofore described, a positive impulse to be transmitted over the line conductors L1 and L2 to the remote station.

By closing its contacts $i$, relay P completes a locking circuit for itself from conductor 321 through contacts $i$ of relay P, conductor 385, contacts $d$ of key MCK to conductor 346. This locking circuit remains closed until a predetermined time after the master trip key MTK is released so that it opens its contacts $a$ in the original energizing circuit of relay MO1. Relay MO1, however, remains energized because a series circuit is then completed for the windings of relays MO1 and MO2 from the positive terminal of battery B through the winding of relay MO2, conductor 344, contacts $c$ of relay MO1, conductor 343, winding of relay MO1, to the negative terminal of battery B. A predetermined time after relay MO2 is energized, the relay MO1 is deenergized and then the relay MO2 is deenergized in the manner heretofore described. When relay MO2 opens its contacts $e$, which are connected in parallel with contacts $a$ of relay MO1 in the holding circuit for the relay P, the positive tripping impulse is removed from the line conductors L1 and L2.

The relay MO2, by opening its contacts $d$, interrupts the heretofore described series circuit for the relays RIN and RIT. Relay RIN, by opening its contacts $e$ and closing its contacts $d$ short circuits the indication relay IR32 which by opening its contacts $a$ interrupts the circuit of the red lamp LR32 so that this lamp is extinguished. Relay RIT, by opening its contacts $i$, interrupts the heretofore described circuits for the time relays S2 and S3 so that no more operating impulses can be transmitted until after an indication impulse has been transmitted from the remote station to the dispatcher's office.

At the remote station the positive tripping impulse effects the energization of the relays L′ and L′P′. By closing its contacts $e$, relay L′P′ completes a circuit from the positive terminal of battery B′ through contacts $e$ of relay L′P′, conductor 116, contacts $e$ of relay R′I′T′, conductor 386, winding of relay R′C′P′, conductor 350, contacts $h$ of relay R′C′T′, conductor 351, contacts $g$ of relay C′4, to the negative terminal of battery B′. By closing its contacts $a$, relay R′C′P′ completes a circuit of relay C′5 from the positive terminal of battery B′ through contacts $a$ of relay R′C′P′, conductor 355, contacts $b$ of relay R′C′T′, conductor 356, winding of relay C′5, to the neutral terminal of battery B′.

If the tripping impulse is of sufficient duration, relay C′5 closes its contacts $c$ and completes a circuit from the positive terminal of battery B′ through contacts $i$ of relay L′P′, conductor 363, contacts $c$ of relay C′5, conductor 362, winding of relay C′6, to the neutral of battery B′. By closing its contacts $e$, relay C′6 completes a locking circuit for itself around contacts $c$ of relay C′5.

By closing its contacts $g$, relay C′6 completes a circuit from the positive terminal of battery B′ through contacts $g$ of relay C′5, conductor 387, contacts $c$ of relay R′C′P′, conductor 388, contacts $gg$ of relay S′1, conductor 389, contacts $gg$ of relay G′4, conductor 390, wiper and contact 16 of bank 4F′5, conductor 391, winding of trip relay T′R′32, to the negative terminal of battery B′. The energization of relay T′R′32 releases the latch L′32 so that the apparatus unit A′U′32 moves to its open position thereby opening its auxiliary contacts $a$ and closing its auxiliary contacts $b$ so that the potential applied to conductor 254 is reversed, which in turn effects the deenergization of the indicating relay I′A′32 and of the relay I′C′. By closing its contacts $b$, relay I′C′ effects the completion of the heretofore described circuits for relay I′T′. Also, by opening its contacts $i$, relay I′C′ interrupts the heretofore described circuits for relays R′I′N′ and R′I′T′ which in turn effects the deenergization of the relays R′C′N′, C′5 and the trip relay T′R′32. By opening its contacts $a$, relay I′C′ also effects the deenergization of relay C′4. As a result of relay I′T′ opening its contacts $e$ and relay I′C′ closing its contacts $e$ the relays S′2 and S′3 are deenergized in the manner heretofore described.

When the tripping impulse is removed from the line conductors L1 and L2 by the dispatcher releasing the trip key MTK, relays L′ and L′P′ become deenergized and relay L′P′, by opening its contacts $i$, interrupts the heretofore described locking circuit for the relay C′6 so that this relay becomes deenergized. By closing its contacts $b$, relay L′P′ completes an energizing circuit for the relay P′ from the positive terminal of battery B′ through winding of relay P′, conductor 256, contacts $g$ of relay I′T′, conductor 357, contact 20 and wiper of bank CS5, conductor 258, contacts $b$ of relay S′3, conductor 259, contacts $d$ of relay L′N′, conductor 260, contacts $b$ of relay L′P′, conductor 261, contacts $a$ of relay C′2, conductor 262, contact 20 and wiper of bank C′S′4, conductor 105, contacts $d$ of relay D′1, to the neutral terminal of battery B′. The energization of relay P′ causes a long positive indication impulse to be transmitted over the line conductors L1 and L2. At the same time the relay P′ is energized, a circuit is completed for time relay S′2 in the manner heretofore described, and this relay, after being energized for a predetermined length of time, completes a circuit for the time relay S′3, which, by opening its contacts $b$, interrupts the heretofore traced circuit for the relay P′ and thereby effects the removal of the positive indication impulse from the line conductors L1 and L2.

At the dispatcher's office the positive indication impulse effects the energization of the relays L and LP. By closing its contacts $e$, relay LP completes a circuit for the relay RIP from the positive terminal of battery B, through contacts $b$ of relay RC, conductor 118, contacts $e$ of relay LP, conductor 310, contacts $i$ of relay C1, conductor 311, winding of relay RIP, to the negative terminal of battery B. By closing its contacts $i$, relay RIP prepares a series locking circuit for itself which is energized at the end of the indication impulse from the positive terminal of battery B, through winding of relay RIT, conductor 312, contacts $d$ of relay MO2, conductor 313, contacts $i$ of relay RT6, conductor 314, contacts $d$ of relay LN, conductor 315, contacts $i$ of relay RIP, conductor 311, winding of relay RIP, to the negative terminal of battery B. By closing its contacts $e$, relay RIP completes the heretofore described energizing circuit for indicating relay IG32, which in turn, by closing its contacts $a$, completes the circuit of the green lamp LG32, the lighting of which indicates to the dispatcher that the apparatus unit A′U′32 is in its open position.

By opening its contacts $b$ in response to the indication impulse, relay LP interrupts the heretofore described circuit for the relay S2 so that it in turn effects the deenergization of the relay S3.

When the indication impulse is removed from the line conductors L1 and L2, the relay LP becomes deenergized and a circuit is completed for the relay P in the manner heretofore described so that a long positive indication check impulse is transmitted over the line conductors L1 and L2 to the remote station.

At the remote station this long positive indication check impulse effects in the manner described the energization of the relays L'P', R'I'P' and R'I'T'. By closing its contacts g, relay R'I'P' effects in the manner heretofore described the energization of the relay C'4, which in turn, by closing its contacts i, completes an energizing circuit for the indicating relay I'A'32 from the negative terminal of battery B' through resistor 393, conductor 394, contacts e of relay R'I'P', conductor 381 contacts e of relay C'2, conductor 380, contacts i of relay C'4, conductor 379, contacts g of relay H'4, conductor 378, wiper and contact 16 of bank 4F'3, conductor 365, winding of relay I'A'32, conductor 254, contacts b of apparatus unit A'U'32, to the positive terminal of battery B'. By closing its contacts g, relay I'A'32 completes a locking circuit for itself.

The dispatcher may operate the selected apparatus unit A'U'32 as many times as he desires without releasing the selection. When the dispatcher desires to release the selection he moves the operated select key SK32 to its normal position. For the purpose of this description, it will be assumed that the apparatus unit A'U'32 is in its closed position at the time the dispatcher restores the select key SK32 to its normal position. Therefore, the relays I'C', R'I'N' and R'I'T' are energized at the remote station, and relays RIN, RIT and IR32 at the dispatcher's office are energized and the lamp LR32 is lighted when the dispatcher initiates the reset operation.

The opening of the contacts a of the select key SK32 interrupts the holding circuit for the relay windings HMB and H4B if the contacts b of relay S3 are open at the same time. By closing its contacts h, relay HM completes an energizing circuit for the reset relay D1 from the positive terminal of battery B through the winding of relay D1, conductor 395, contacts i of relay S3, conductor 396, contacts h of relay HM, conductor 397, contacts i of relay RT1, to the neutral terminal of battery B. By closing its contacts aa, relay D1 completes a locking circuit for itself from the positive terminal of battery B through the winding of relay D1, conductor 395, contacts aa of relay D1, conductor 398, to the neutral terminal of battery B through contacts e of relay RO, contacts g of relay RT1, contacts i of relay RT2, contacts g of relay RT3, contacts g of relay RT4, contacts g of relay RT5, contacts g of relay C1 and contacts g of relay S3 in parallel. The locking circuit of relay D1 is also completed from conductor 398 through contacts f of relay HM, conductor 404, contacts e of relay C3, conductor 405, and contacts e of relay GM to neutral terminal of battery B. By closing its contacts g, relay D1 completes a circuit for relay RC from the positive terminal of battery B through the winding of relay RC, conductor 399, contacts g of relay D1, to the neutral terminal of battery B. By closing its contacts g, relay RC completes a locking circuit for itself through conductor 409 and contacts f of relay LN so that the relay RC remains energized until the relay LN is energized in response to a reset impulse transmitted from the remote station to the dispatcher's office.

When the relay RC becomes energized, its contacts i maintain a shunt circuit around the contacts i of relay RT6 so that the last indication impulse, which was a negative impulse under the conditions assumed, remains registered on the relays RIN and RIT until the relay RC is deenergized.

By opening its contacts f, relay D1 interrupts the holding circuits for the relays RO, RL, RN1, RT1, RN2, RT2, RN3, RT3, RN4, RT4, RN5, RT5, RN6 and RT6 so that these relays are restored to their normal positions. By opening its contacts dd, relay D1 interrupts the holding circuit for relay S1. By closing its contacts h, relay S1 completes through conductor 157' and contact 16 and wiper of bank CS3 a notching circuit for magnet CSM so that the switch CS is moved to its position 17. In positions 17—23, inclusive, of switch CS the wiper of bank CS3 completes a notching circuit for magnet CSM so that the switch CS moves immediately to its position 24. In position 24 a circuit is completed for the relay T through contact 24 and wiper of bank CS3 so that a notching circuit is completed for magnet CSM to restore the switch CS to its normal position 25.

The opening of contacts d of relay D1 interrupts the energizing circuit for the relays G4 and GM. By opening its contacts e, relay RT6 interrupts the energizing circuit of relay C1, which in turn, by opening its contacts e, interrupts the circuit of relay C2.

When all of the relays RO, RT1 to RT5 inclusive, C1, S3, and GM are deenergized, the heretofore described holding circuit for relay D1 is opened. By closing its contacts b, relay D1 completes, when the sender CS reaches its normal position 25, a circuit for relay N from the negative terminal of battery B through winding of relay N, conductor 162, contacts g of relay RIN, conductor 373, contacts g of relay RIT, conductor 323, contacts b of relay S4, conductor 402, contacts m of relay RC, conductor 403, contacts h of relay C3, conductor 403', contact 25 and wiper of bank CS5, conductor 164, contacts b of relay D1, conductor 165, contacts b of relay LN, contacts b of relay LP, to the neutral terminal of battery B. The energization of relay N causes a negative reset impulse of a short duration to be transmitted over the line conductors L1 and L2. By closing its contacts k, relay N completes a circuit for relay S4 from the positive terminal of battery B through winding S4, conductor 407, contacts k of relay N, conductor 408, contacts hh of relay D1, conductor 409, contacts e of relay RC, to the neutral terminal of battery B. By closing its contacts e, relay S4 completes a locking circuit for itself from conductor 407 through contacts e of relay S4, conductor 410 and contacts hh of relay C3 to conductor 408. By opening its contacts b, relay S4 interrupts the heretofore described circuit for relay N so as to insure that the reset impulse is of a short duration.

At the substation the negative reset impulse momentarily effects the energization of the relays N', L'N' and R'C'N'. Since the reset impulse is of a relatively short duration, the relay C'5 is not energized for a sufficient length of time for it to operate. Therefore, when the reset impulse is removed from the line conductors, a circuit is completed from the positive terminal of battery B' through contacts f of relay D'1, conductor 176, operating winding R'C'T'A' of relay R'C'T', conductor 411, contacts f of relay C5, conductor 412, contacts e of relay R'C'N', conductor 349, winding of relay R'C'N', conductor 350, contacts h of relay R'C'T', conductor 351, contacts g of relay C'4, to the negative terminal of battery B'. By closing its contacts e, relay R'C'T' completes a circuit for a holding winding R'C'T'B' of the relay R'C'T' from the negative terminal of battery B' through the holding winding R'C'T'B' of relay R'C'T', conductor 413, contacts e of relay R'C'T', conductor 414, contacts g of relay C'2, to the neutral terminal of battery B'. By opening its contacts b, relay R'C'T' interrupts the energizing circuit for the time relay C'5 and, by opening its contacts h, relay R'C'T' opens the series circuit through relay R'C'N', and the operating winding R'C'T'A' of relay R'C'T'.

By closing its contacts c, relay R'C'T' connects conductor 339 to the positive terminal of the battery B' so that an energizing circuit is completed for the reset relay D'I. By closing its contacts a, relay D'I completes a locking circuit for itself from conductor 339 through the contacts a of relay D'I, conductor 415, to the positive terminal of battery B', through contacts c of relay C'2, contacts m of relay R'T'6, contacts i of relay R'T'5, contacts i of relay R'T'4, contacts i of relay R'T'3 contacts m of relay R'T'2, contacts k of relay R'T'I and contacts g of R'O' in parallel.

By opening its contacts f, relay D'I opens the holding circuits for the relays R'O', R'L', R'N'I—R'N'6, inclusive, R'T'I—R'T'6, inclusive, R'I'N' and R'I'T'. Relay R'T'I, by closing its contacts b, completes the normal energizing circuit for the relay D'2. By opening its contacts g, relay R'I'N' interrupts the circuit of the relay C'4.

By opening its contacts j, relay D'I opens the circuits of the relays G'4 and G'M'. By opening its contacts hh, relay D'I opens the circuit for relay C'2 and, by opening its contacts h, relay D'I opens the circuits for relays C'I and C'3. By opening its contacts b, relay D'I opens the circuits for the winding H'M'B' of relay H'M' and for winding H'4B' of relay H'4. By opening its contacts d, relay D'I opens the holding circuit for relay S'I.

By closing its contacts d, relay S'I completes from conductor 235 through conductor 166 and contacts 20 and wiper of bank C'S'3 a notching circuit for magnet C'S'M' to move the switch C'S' from its position 20 to its position 21. In positions 21—23, inclusive, of switch C'S' the wiper of bank C'S'3 completes a notching circuit for magnet C'S'M' so that the switch C'S' moves immediately to its position 24 in which position a circuit is completed for relay T' through contact 24 and wiper of bank C'S'3 so that a notching circuit is completed for magnet C'S'M' to restore the switch C'S' to its normal position 25.

When the switch C'S' reaches position 25, the heretofore described energizing circuit for relay N'O' is completed to establish the normal check circuit through the line conductors LI and L2 and the relays L and L' as soon as the various relays at the remote station here become deenergized so that the relay D'I is deenergized. At the substation the current through the normal check circuit causes the relay L' to complete the circuit of the relay L'P', which in turn completes through its contacts e the energizing circuit for the relay R'O'.

At the dispatcher's office the current through the normal check circuit causes the relay L to complete the energizing circuit for the relay LN. By opening its contacts f, relay LN opens the circuit of the relay RC, which in turn, by opening its contacts e, effects the deenergization of the relay S4. By opening its contacts d, relay LN opens the series circuit through the relays RIN and RIT. By closing its contacts a, relay LN reestablishes the heretofore described circuit for relay RO, which in turn completes through its contacts g the heretofore described circuit for normal check relay NCS. By closing its contacts e, relay NCS reestablishes the circuit of the start lamp STL, the lighting of which indicates to the dispatcher that the equipment is completely reset.

When the supervisory equipment is in its normally reset condition and a select key is operated at the same time an apparatus unit changes its position, it will be seen that the apparatus unit normally has preference to effect the transmission of an impulse code because the code selection C'S' is immediately operated to effect the transmission of a code whereas the code selector CS cannot be operated until after the finder switches at the dispatcher's office have moved to the positions thereof allotted to the operated select key. Before this can happen, relay C3 is energized to prevent the finder switches at the dispatcher's office from operating until after relay RT6 has been energized.

If the first two impulses of the check code do not agree with the first two impulses of the select code when the select key SK—32 is operated, the group relay G—4 and the master group relay GM are deenergized by the relay RT—2 opening its contacts b at the termination of the second impulse of the check code. By opening its contacts g the master group relay GM opens the energizing circuits of the indication relays LG—32 and IR—32 so that none of the lamps LG—32, LR—32 and LW—32 is lighted.

By opening its contacts e and g relay G—4 opens the holding circuit for relay H—4 so that it becomes deenergized and in turn by opening its contacts k interrupts the holding circuit of relay HM. By closing its contacts h, relay HM prepares in a manner hereinafter described, an energizing circuit for the reset relay D—I as soon as relay S—3 is energized at the termination of the indication impulse.

If the last four impulses of the check code do not agree with the last four impulses of the select code, the opening of contacts b of relay C—I at the termination of the last impulse of the check code effects the deenergization of the relays H—4 and HM. The deenergization of the relay HM then effects the energization of the reset relay D—I in the manner just described.

If the select key SK—32 is still in its operated position when the supervisory equipment has been restored to its normal condition, the equipment will again function to try to establish the desired selection.

When the supervisory equipment is at rest in its normal condition and an apparatus unit changes its position, an indication is immediately transmitted to the dispatcher's office to cause the indicating lamps individual to the operated apparatus unit to indicate the new position thereof. For the purpose of this description, it will be assumed that, while supervisory equipment is at rest, the apparatus unit A'U'32 automatically opens.

When the apparatus unit A'U'32 moves to its open position, the opening of its auxiliary contacts a and the closing of its auxiliary contacts b effects in the manner heretofore described the deenergization of the associated indication relay I'A'32. By closing its contacts b, relay I'A'32 completes a notching circuit for magnet C'S'M' from the positive terminal of battery B' through contacts b of magnet C'S'M', conductor 232, wiper and contact 25 of bank C'S'3, conductor 233, contacts a of relay N'C'S', conductor 234, contacts i of relay N'O', conductor 255, contacts b of relay I'A'32, conductor 235, magnet C'S'M', to the negative terminal of battery B' so that the switch C'S' moves from its position 25 to its position 1. In positions 1-4, inclusive, of switch C'S' the relay T' is energized through the contacts and wiper of bank C'S'3 in the manner heretofore described so that a notching circuit is completed for magnet C'S'M' to move the switch C'S' to position 5. When the switch C'S' reaches position 4, a circuit is completed for magnets G'M' and G'4 from the positive terminal of battery B' through contacts b of relay R'T'2, conductor 419, contacts b of relay C'3, conductor 418, contacts c of relay R'O', conductor 417, wiper and contact 4 of bank C'S'6, conductor 416, contacts d of relay I'A'32, conductor 206, winding of relay G'4, conductor 207, contacts b of relay G'1, conductor 208, winding of relay G'M', to the negative terminal of battery B'. By closing its contacts a, relay G'4 completes a locking circuit for itself between conductors 418 and 416 so that the relays G'4 and G'M' remain energized after the switch C'S' leaves position 4. By closing its contacts e, relay G'4 completes a notching circuit for the magnet 4F'M' from the positive terminal of battery B' through contacts b of relay D'1, conductor 211, contacts bb of relay S'1, conductor 212, contacts d of relay C'3, conductor 214, contacts e of relay G'4, conductor 215, winding H'4A of relay H'4 and magnet 4F'M' in parallel, conductor 216, contacts b of magnet 4F'M', conductor 217, to the negative terminal of battery B', through winding H'4B' of relay H'4 and through contacts b of relay H'4, conductor 218, and resistor 219. This notching circuit for magnet 4F'M' moves the switch 4F' from whatever position it may be in to position 16 in which position the magnet 4F'M' and the winding H'4A' of relay H'4 are short-circuited by a circuit from conductor 216, through contacts g of relay G'4, conductor 219, wiper and contact 16 of bank 4F'1, conductor 220, contacts f of relay I'A'32, conductor 419', contact 16 and wiper of bank 4F'2, conductor 420, contacts i of relay G'4, conductor 421, contacts d of relay C'1, conductor 422, contacts bb of relay C'3, conductor 211, contacts b of relay D'1, to the positive terminal of battery B'. This short-circuit causes relay H'4 to pick up and, by closing its contacts c, completes through contacts d of relay C'3 a notching circuit for magnet M'F'M' so that the finder switch M'F' is moved from whatever position it may be in to its position 16 in which position a short-circuit is completed around the operating magnet M'F'M', through contacts e of relay H'4, conductor 230, and wiper and contact 16 of bank M'F'1 to conductor 220 which is connected to the positive terminal of battery B' in the manner just described. This short-circuit also causes the relay H'M' to pick up and, by closing its contacts e, completes an energizing circuit for the relay S'1 from the positive terminal of battery B', through winding of relay S'1, conductor 237, contacts e of relay H'M', conductor 238, contacts f of relay C'3, conductor 239, contacts 5 and wiper of bank C'S'4, conductor 105, contacts d of relay D'1, to the neutral terminal of battery B'. Relay S'1 then operates in the manner heretofore described to effect the operation of the code sender C'S' so that it moves from its position 5 to its position 20 and, during this movement, transmits a code of six negative impulses, which is the code individual to the apparatus unit A'U'32. Since in this case the remote station transmits code before it receives code, the relay S'1, by opening its contacts b, interrupts the original energizing circuit of the relay C'3 before the relay R'T'1 is energized.

When the normal check circuit through the line conductors L1 and L2 is interrupted by the switch C'S' leaving its normal position 25, relays L and LN at the dispatcher's office are deenergized and the relay LN effects, in a manner heretofore described, the energization of the relay RL. By opening its contacts f, relay RL put out the start lamp STL. By closing its contacts e, relay RL completes an energizing circuit for the pilot lamp relay PLR from the negative terminal of battery B through the winding of relay PLR, conductor 424, contacts d of relay S2, conductor 425, contacts d of relay S1, conductor 426, contacts e of relay RL to the positive terminal of battery B. Relay PLR, by closing its contacts c, completes a locking circuit for itself through conductor 427, the contacts b of pilot lamp key PLK, and, by closing its contacts a, completes a circuit for the pilot lamp PL. The lighting of the lamp PL in this case, informs the dispatcher that an apparatus unit has changed it position. The dispatcher may extinguish the lamp PL by operating the lamp key PLK so as to open the locking circuit for the relay PLR.

By closing its contacts i, relay RL completes an energizing circuit for the relay C3 from the positive terminal of battery B through winding of relay C3, conductor 302, contacts g of relay NCS, conductor 303, contacts i of relay RL, conductor 304, contacts f of relay S1, conductor 305, contacts f of emergency reset key ERK to the neutral terminal of battery B. By closing its contacts a, relay C3 completes a locking circuit for itself from conductor 302 through contacts a of relay C3, conductor 306, contacts d of relay S4, to conductor 305.

At the dispatcher's office the six negative impulses of the select code, which are transmitted by the code sender C'S' in response to the automatic operation of the apparatus unit A'U'32, effect the energization of the relays RN1, RT1, RN2, RT2, RN3, RT3, RN4, RT4, RN5, RT5, RN6 and RT6 in the same manner as the check code effects the energization of these relays during a control operation. The energization of the relays RN1 and RN2 complete the heretofore described circuit for the group relays G4 and GM. By closing its contacts c, relay GM completes a shunt circuit around the contacts d of relay S4 in the locking circuit of relay C3. By closing its contacts e, the relay G4 prepares a circuit to release successively the finder selectors 4F and MF, but this release circuit cannot be completed until the sixth code impulse has been received and has effected the energization of the relay RT6. The energized relays RN3, RN4, RN5 and RN6 establish a holding circuit to contact 16 of banks MF and 4F so that these switches stop in this position when they are set into operation.

When relay RT6 becomes energized upon the removal of the sixth impulse transmitted from the remote station, a notching circuit is completed for magnet 4FM from conductor 139 through contacts e of relay G4, conductor 140, contacts b of relay C1, conductor 197, contacts g of relay RT6, conductor 198, contacts ff of relay D1, conductor 199, contacts b of relay S3, to the positive terminal of battery B. This circuit causes the magnet 4FM to operate to move the switch 4F from whatever position it may be in to position 16, in which position the heretofore described shunt circuit around the magnet 4FM is established to stop the movement of the switch 4F in position 16, and to cause relay H4 to pick up and effect the movement of switch MF to its position 16 in the manner heretofore described. By closing its contacts e, relay H4 completes a short-circuit around the winding of indication relay IR32 from the negative terminal of battery B through contacts d of relay RIN, conductor 371, contacts e of relay H4, conductor 430, wiper and contact 16 of bank 4F4 to conductor 372. By opening its contacts a, relay IR32 opens the circuit of red lamp LR32.

When the switch MF reaches its position 16 and effects the energization of relay HM, the relay S1 operates to start the code sender CS in the manner heretofore described so that a check code of six negative impulses, corresponding to the selection which has been made at the dispatcher's office, is transmitted over the line conductors L1 and L2 to the remote station.

As soon as the code sender CS leaves its position 25, the circuit of relay NCS is opened at the contact 25 of bank CS6. By closing its contacts b, relay NCS completes a holding circuit for master group relay GM from the positive terminal of battery B, through contacts b of relay NCS, conductor 501, contacts c of relay C3, conductor 502, contacts a of relay GM, conductor 503, resistor 504, conductor 135, winding of relay GM to the negative terminal of battery B.

This check code of six negative impulses effects the energization of the relays R'N'1, R'T'1, R'N'2, R'T'2, R'N'3, R'T'3, R'N'4, R'T'4, R'N'5, R'T'5, R'N'6 and R'T'6 in the same manner as the six impulses of the select code during a control operation. When relay R'T'6 becomes energized in response to the removal of the last impulse of the check code, the heretofore described circuit for relay C'1 is completed through the contacts g of relay R'T'6. When relay R'T'2 becomes energized in response to the removal of the second impulse of the check code, its contacts b open the series holding circuit for relays G'4 and G'M'. However, if the first two impulses of the check code are negative impulses and therefore agree with the first two impulses of the select code transmitted to the dispatcher's office, the series circuit of relays G'4 and G'M' is maintained completed from the conductor 206, contacts e of relay R'N'2, conductor 205, contacts c of R'N'1, conductor 204, contacts a of relay G'M', conductor 203, contacts j of relay D'1, to the positive terminal of battery B'.

By opening its contacts d, relay C'1 opens the heretofore described holding circuits for relays H'4 and H'M'. However, if the last four impulses of the check code are negative impulses and therefore agree with the corresponding impulses of the select code which were transmitted to the dispatcher's office, the heretofore described holding circuits for relays H'4 and H'M' are completed through the heretofore described series connected contacts of the energized relays C'1, R'N'3, R'N'4, R'N'5, R'N'6 and G'4.

If the select and check codes agree, the relay C'1 maintains its contacts i closed for a sufficient length of time to allow the time relay C'2 to operate. By closing its contacts a, relay C'2 completes the heretofore described circuit for the relay P' so that a positive indication impulse is transmitted over the line conductors L1 and L2. At the same time the relay P' is energized, a circuit is completed for the time relay S'2, which effects the energization of time relay S'3 and the deenergization of the relay P' after predetermined time intervals in the manner heretofore described.

At the dispatcher's office, the positive indication impulse effects the operation of the relay RIP, which, by closing its contacts i, completes the heretofore described locking circuit for itself through the winding of relay RIT. By closing its contacts e, relay RIP completes the heretofore described circuit for the indication relay IG32 so that this relay causes the green lamp LG32 and the white lamp LW32 to be lighted. The dispatcher may extinguish the white lamp LW32 by moving the key DK32 to its position corresponding to the open position of the apparatus unit A'U'32.

When the indication impulse is removed from the line conductors L1 and L2 and relay LP closes its contacts b, the heretofore described circuits for the relays P and S2 are completed through the contact 16 and wiper of bank CS5. The energization of the relay P causes a positive indication check impulse to be transmitted over the line conductors L1 and L2, and the relay S2 effects, in the manner heretofore described, the energization of the time relay S3. Relay S3, by opening its contacts d, interrupts the original energizing circuit for the relay P, but the relay P does not become deenergized because of a holding circuit which is completed from the positive terminal of battery B, winding of relay P, conductor 321, contacts g of relay RIP, conductor 322, contacts e of relay RIT, conductor 323, contacts f of relay S4, conductor 402, contacts g of relay S2, conductor 403, contacts i of relay C3, to conductor 165 which is connected to the neutral terminal of battery B.

By closing its contacts i, relay S3 completes an energizing circuit for the relay D1 from the positive terminal of battery B through winding of relay D1, conductor 395, contacts i of relay S3, conductor 396, contacts k of relay C3, conductor 397, contacts i of relay RT1, to the neutral terminal of battery B. By closing its contacts aa, relay D1 completes the heretofore described locking circuit for itself and, by closing its contacts g, completes the heretofore described energizing circuit for relay RC which, in turn, by closing its contacts g, completes a locking circuit for itself. By closing its contacts m, relay RC completes a shunt circuit around the contacts g of relay S2 in the locking circuit for the relay P, and, by closing its contacts k, relay RC completes a shunt circuit around the contacts d of relay S4 in the locking circuit of relay C3.

The energization of the relay D1 causes, in the manner heretofore described, the switch CS to return to its normal position 25 and the relays RO, RT1—RT5 inclusive, C1, C2, S2, S3, HM and H4 to be deenergized after which the relay D1 is deenergized. By closing its contacts hh when it becomes deenergized, relay D1 completes an energizing circuit for relay S4 from the positive terminal of battery B through winding of relay S4, conductor 407, contacts k of relay P and contacts kk of relay C3 in parallel, conductor 408, contacts hh of relay D1, conductor 409, contacts e of relay RC, to the neutral terminal of battery B. By closing its contacs e, relay S4 completes a locking circuit for itself through conductor 410 and contacts gg of relay C3. By opening its contacts b and f, relay S4 interrupts the locking circuit for relay P so as to remove the indication check impulse from the line conductors L1 and L2.

At the remote station the positive indication check impulse effects the energization of the relay R'I'P'. By closing its contacts g, relay R'I'P' completes the heretofore described circuit for relay C'4 which, in turn, by closing its contacts i, reestablishes the energizing circuit for the indication relay I'A'32. By closing its contacts g, relay I'A'32 completes a locking circuit for itself. When the positive indication check impulse is removed from the line conductors, the series energizing circuit for the relays R'I'T' and R'I'P' is completed in the manner heretofore described. By closing its contacts i, relay R'I'T' completes an energizing circuit for the reset relay D'1 from the positive terminal of battery B', through contacts i of relay R'I'T', conductor 340, contacts dd of relay C'3, conductor 339, winding of relay D'1, to the neutral terminal of battery B'. The energization of the relay D'1 causes the apparatus at the remote station to reset in the manner heretofore described.

When the apparatus at the remote station has been returned to its normal position, the relay N'O' is again energized to complete the normal check circuit through the line conductors L1 and L2. At the dispatcher's office the normal check current causes the relay LN to effect the deenergization of the relays RC, C3, S4, RIN and RIT in the manner heretofore described so as to cause all of the apparatus at the dispatcher's office to be restored to its normal position.

The dispatcher may at any time reset the supervisory equipment to its normal position by operating the emergency reset key ERK so that its contacts a are closed for a sufficient length of time to effect the energization of the reset relay D—1 which then operates in the manner heretofore described to restore the supervisory equipment to its normal position.

When the auxiliary switch of an apparatus unit fails so that the associated indication relay I'A' remains deenergized, it is evident that after the apparatus unit has been selected an indicating impulse corresponding to the position thereof cannot be sent to the dispatcher's office. The fact that an amber lamp is lighted while the associated red and green lamps remain extinguished notifies the dispatcher that the associated apparatus unit is in trouble.

The dispatcher may select and operate other apparatus units, notwithstanding the fact that the auxiliary switch of one of the units may be faulty, by first operating the select key corresponding to the desired apparatus unit and then operating the emergency reset key ERK to its reset position for a predetermined time. By closing its contacts a, key ERK completes an energizing circuit for reset relay D—1 which causes the resetting of the apparatus at the dispatcher's office in the manner heretofore described. By opening its contacts f, the key ERK interrupts the circuit of relay C—3, and since relays C—2 and S—1 are also deenergized it is evident that while the reset key ERK is in its reset position a notching circuit is completed for the operating magnet of the group finder switch associated with the operated select key and then for the operating magnet of the master finder switch from conductor 140 through contacts b of relay S—1, conductor 141, contacts b of relay C—2, conductor 142, contacts d of relay C—3 to the positive terminal of battery B.

When the reset key ERK is restored to its normal position and relay D—1 becomes deenergized, the closing of contacts b of relay D—1 causes in the manner heretofore described a short reset impulse to be transmitted to the remote station which cause the relay R'C'T' to become energized and energize reset relay D'1 to reset the apparatus thereat in the manner heretofore described. In order to insure that the circuit of the energized group relay is opened for a sufficient length of time for it to drop out, when relay D'1 opens its contacts j under these conditions the locking circuit of the group relay through its contacts a is maintained open at contacts b of relay R'T'2 until sufficient time has elapsed for time relay C'2 to open its contacts g in the energizing circuit of winding R'T'2B of relay R'T'2.

When the remote station apparatus has been reset, normal line current is applied to the line conductors L—1 and L—2 to complete the resetting of the apparatus at the dispatcher's office by effecting the deenergization of relay RC in the manner heretofore described.

The apparatus at both stations is then in condition to send impulses, but since relay N'C'S' at the remote station is a time relay, it does not have time to pick up and start the sender C'S' into operation before relay S—1 at the dispatcher's office can operate and start the sender CS into operation. The dispatcher equipment, therefore, has preference and the first code impulse received at the remote station causes relay N'O' to become deenergized and by opening its contacts i prevents operation of the remote station sender C'S' due to the deenergized I'A' relay associated with the faulty auxiliary switch. The remote station equipment is thus free to respond to the select code in the normal manner.

Therefore, by operating the select key corresponding to a desired selection before operating the energizing reset key ERK the dispatcher can make any desired selection notwithstanding the fact that an indication relay I'A' associated with an apparatus unit is permanently deenergized due to a faulty auxiliary switch on the unit.

While I have, in accordance with the Patent Statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a controlling station, a remote station, line conductors interconnecting said stations, a plurality of apparatus units at said remote station, indicating means at said controlling station individual to and normally indicating the position of each apparatus unit, an individual select key at said controlling station for each apparatus unit, a multiple position finder switch at said controlling station having individual positions allotted to different select keys, means responsive to the operation of a select key for effecting the operation of said finder switch to the position thereof allotted to the operated select key, means responsive to said finder switch being in the position thereof allotted to an operated select key for causing the indicating means of the apparatus unit individual to the operated select key to discontinue indicating the position thereof and for selecting at said remote station the apparatus unit corresponding to the operated select key for operation from said controlling station including means for transmitting over said conductors to said controlling station an indication impulse of a character individual to the position of the selected apparatus unit, and means at said controlling station responsive to said indication impulse for operating the indicating means individual to the operated select key so that it again indicates the position of the corresponding apparatus unit if the proper unit has been selected.

2. In combination, a controlling station, a remote station, line conductors interconnecting said stations, a plurality of apparatus units at said remote station, indicating means at said controlling station individual to and normally indicating the position of each apparatus unit, an individual select key at said controlling station for each apparatus unit, a multiple position finder switch at said controlling station having individual positions allotted to different select keys, means responsive to the operation of a select key for effecting the operation of said finder switch to the position thereof allotted the operated select key, means responsive to said finder switch being in the position thereof allotted to an operated select key for causing the indicating means of the apparatus unit individual to the operated select key to discontinue the indication of the position thereof and for transmitting over said conductors to said remote station a select code of impulses individual to the operated select key, means at said remote station responsive to said select code of impulses for selecting the apparatus unit corresponding thereto and for effecting the transmission over said conductors to said controlling station of a check code of impulses individual to the selected apparatus unit followed by an indication impulse of a character individual to the position of the selected apparatus unit, and means at said controlling station responsive to said check code and said indication impulse for operating the indicating means individual to the operated select key so that it again indicates the position of the apparatus unit individual to the operated select key if the proper unit has been selected.

3. In combination, a controlling station, a remote station, line conductors interconnecting said stations, a plurality of apparatus units at said remote station, indicating means at said controlling station individual to and normally indicating the position of each apparatus unit, an individual select key at said controlling station for each apparatus unit, said select keys being arranged in groups, a group multiple position finder switch at said controlling station for each group of keys and having an individual position thereof allotted to each select key in the associated group, a master multiple position finder switch at said controlling station having individual positions thereof allotted to a select key in each group, means responsive to the operation of a select key for effecting the sequential operation of the associated group and master finder switches to the respective positions thereof allotted to the operated select key, means responsive to the associated group finder switch being in the position thereof allotted to an operated select key, means responsive to the associated group finder switch being in the position thereof allotted to an operated select key for causing the indicating means of the apparatus unit individual to the operated select key to discontinue indicating the position thereof, means responsive to the master group finder switch being in the position thereof allotted to an operated select key for selecting the apparatus unit corresponding to the operated select key including means for transmitting over said conductors to said controlling station an indication impulse of a character individual to the position of the selected apparatus unit, and means at said controlling station responsive to said indication impulse for operating the indicating means individual to the operated select key so that it again indicates the position of the corresponding apparatus unit if the proper unit has been selected.

4. In combination, a controlling station, a remote station, line conductors interconnecting said stations, a plurality of apparatus units at said remote station, indicating means at said controlling station individual to and normally indicating the positions of each apparatus unit, an individual select key at said controlling station for each apparatus unit, said select keys being arranged in groups, a group multiple position finder switch at said controlling station for each group of keys and having an individual position thereof allotted to each select key in the associated group, a master multiple position finder switch at said controlling station having individual positions thereof allotted to a select key in each group, means responsive to the operation of a select key for effecting the sequential operation of the associated group and master finder switches to the respective positions thereof allotted to the operated select key, means responsive to the associated group finder switch being in the position thereof allotted to an operated select key for causing the indicating means of the apparatus units individual to the operated select key to discontinue indicating the position thereof, means responsive to the master group finder switch being in the position thereof allotted to an operated select key for transmitting over said conductors to said remote station a select code of impulses individual to the operated select key, means at said remote station responsive to said select code of impulses for selecting the apparatus unit corresponding thereto and for effecting the transmission over said conductor to said controlling station of a check code of impulses individual to the selected apparatus unit followed by an indication impulse of a character individual to the position of the selected apparatus unit, and means at said controlling station responsive to said check code and said indication impulse for operating the indicating means individual to the operated select key so that it again indicates the position of the apparatus unit individual to the operated select key if the proper unit has been selected.

5. In combination, a controlling station, a remote station, conductors interconnecting said stations, a plurality of apparatus units at said remote station, indicating means at said controlling station individual to and normally indicating the position of each apparatus unit, means responsive to a change in position of an apparatus unit for transmitting over said conductors to said controlling station a select code of impulses individual to the apparatus unit which has changed its position, means at said controlling station responsive to said select code for selecting and causing the indicating means corresponding to the changed apparatus unit to discontinue the indication of the position thereof and for causing a check code of impulses corresponding to the selected indicating means to be transmitted over said conductors to the remote station, means at said remote station responsive to said check code for causing an indication impulse of a character individual to the position of the changed apparatus unit to be transmitted over said conductors to said controlling station, and means at said controlling station responsive to said indication impulse for causing the indicating means corresponding to the changed apparatus unit to indicate the new position of the changed apparatus unit.

6. In combination, a controlling station, a remote station, conductors interconnecting said stations, a plurality of apparatus units at said remote station, indicating means at said controlling station individual to and normally indicating the position of each apparatus unit, means responsive to a change in position of an apparatus unit for transmitting over said conductors to said controlling station a select code of impulses individual to the apparatus unit which has changed its position, means at said controlling station responsive to said select code for selecting and causing the indicating means corresponding to the changed apparatus unit to discontinue the indication of the position thereof and for causing a check code of impulses corresponding to the selected indicating means to be transmitted over said conductors to the remote station, means at said remote station responsive to said check code for causing an indication impulse of a character individual to the position of the changed apparatus unit to be transmitted over said conductors to said controlling station, means at said controlling station responsive to said indication impulse for causing the indicating means corresponding to the changed apparatus unit to indicate the new position of the changed apparatus unit and for causing an indication check impulse to be transmitted over said conductors to said remote station, and means responsive to the termination of said indication check impulse for resetting the selective means at said stations to normal.

7. In combination, a controlling station, a remote station, line conductors interconnecting said stations, a plurality of movable apparatus units at said remote station, an operate key at said controlling station, means including impulses transmitted over said conductors for selecting any of said apparatus units, indicating means at said controlling station individual to and normally indicating the position of each apparatus unit, means responsive to the operation of said operate key for causing an operating impulse to be transmitted over said conductors to said remote station to operate a selected apparatus unit, means operative upon the termination of said operating impulse for causing the indicating means corresponding to the selected apparatus unit to discontinue indicating the position thereof, means responsive to the operation of the selected apparatus unit in response to the operating impulse for transmitting from said remote station to said controlling station an indication impulse of a character individual to the new position of the selected apparatus unit, and means at said controlling station responsive to said indication impulse for operating the indicating means corresponding to the selected apparatus unit so that it indicates the new position thereof.

8. In combination, a first station, a second station, an electric circuit between said stations, a plurality of apparatus units at said second station, selective means at said second station for selecting any of said apparatus units for operation in response to a long current impulse transmitted over said circuit from said first station to said second station, means for effecting the operation of said selective means to select a desired apparatus unit, means responsive to a short impulse transmitted over said circuit from said first station to said second station after a selection has been established for resetting said selective means, a manually controlled operate key at said first station for effecting when in a predetermined operated position the transmission of a current impulse over said circuit, means at said first station for effecting the transmission of a short impulse over said circuit, and means controlled by said operate key for insuring that irrespective of the length of time the operate key is maintained in its operating position any current impulse which may be transmitted as a result of the operation thereof is always long enough to prevent a resetting of the selective means.

9. In combination, a first station, a second station, an electric circuit between said stations, a plurality of apparatus units at said second station, means for transmitting over said circuit from said first station to said second station a code of current impulses individual to each apparatus unit, selective means at said second station responsive to said codes of impulses for selecting an apparatus unit for operation, means at said second station responsive to a relatively long impulse transmitted over said circuit from said first station to said second station after a unit has been selected for effecting the operation of the selected unit and to a relatively short impulse for effecting the release of the selection, means at said first station for effecting the transmission of a short impulse over said circuit, a manually controlled operate key at said first station having an operating position, and means controlled by said operate key for insuring that irrespective of the length of time it is in its operating position any current impulse which may be transmitted as a result of the operation thereof is long enough to prevent the release of the selection.

10. In combination, two stations, conductors interconnecting said stations, impulse responsive selective means at each station having a normal position and a plurality of operative positions, control means at each station for effecting the transmission over said conductors of different codes of impulses to effect the operation of the selective means at the other station to different operative positions thereof, said control means being arranged so that when said selective means at both stations are simultaneously in their normal positions an operated control means at a predetermined one of said stations has preference over an operated control means at the other station in effecting the transmission of impulses over said conductors, and manually controlled means at said other station for restoring said selective means to normal when they are being held in an operative position by an operated control means at said predetermined one of said stations and for causing an operated control means at said other station to have preference over an operated control means at said predetermined one of said stations when the selective means are restored to their normal positions.

11. In combination, a controlling station, a controlled station, conductors interconnecting said stations, impulse responsive selective means at each station having a normal position and a plurality of operative positions, control means at each station for effecting the transmission over said conductors of different codes of impulses to effect the operation of the selective means at the other station to different operative positions thereof, said control means being arranged so that when said selective means are simultaneously in their normal positions an operated control means at the controlled station normally has preference over an operated control means at the controlling station in effecting the transmission of impulses over said conductors and manually controlled means at said controlling station for restoring said selective means to normal when they are being held in an operative position by an operated control means at said control station causing an operated control means at said controlling station to have preference over an operated control means at said controlled station when control means at both stations are simultaneously operated and the selective means at both stations are simultaneously in their respective normal positions.

12. In combination, a dispatcher's office, a substation, conductors interconnecting said office and substation, a plurality of movable apparatus units at said substation, individual indicating means at said dispatcher's office for each apparatus unit normally indicating the position thereof, an individual select key at said dispatcher's office for each unit, an individual indication relay at said substation for each apparatus unit controlled by a change in the position of the associated unit, means responsive to the operation of an indication relay due to the associated unit changing its position for establishing through said conductors a connection to the corresponding indicating means and then transmitting through said established connection an indication impulse to cause the corresponding indicating means to indicate the new position of the changed apparatus unit after which the indication relay is restored to its normal position and the established connection is released, means responsive to the operation of a select key for establishing through said conductors a connection between the apparatus unit and the indicating means corresponding to the operated select key and then the transmission through the established connection of an indication impulse to check the indication displayed by the indicating means, and manually controlled means at said dispatcher's office for releasing the connection established by an operated indication relay which for any reason fails to be restored to its normal position and for establishing instead the connection corresponding to any select key which may have been operated.

CLYDE E. STEWART.